(12) United States Patent
Chen et al.

(10) Patent No.: US 12,256,443 B2
(45) Date of Patent: *Mar. 18, 2025

(54) CHANGING CARRIER SENSE SIGNAL GENERATED BY A RECONCILIATION SUBLAYER OF A PHYSICAL LAYER THAT MAY CAUSE UNINTENDED SIGNALING AT A REDUCED MEDIA INDEPENDENT INTERFACE (RMII)

(71) Applicant: Microchip Technology Incorporated, Chandler, AZ (US)

(72) Inventors: Dixon Chen, Guangdong (CN); John Junling Zang, Guangdong (CN); Yanzi Xu, Guangdong (CN); Venkatraman Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,100

(22) Filed: Nov. 9, 2022

(65) Prior Publication Data

US 2023/0092814 A1    Mar. 23, 2023

Related U.S. Application Data

(63) Continuation of application No. 16/587,583, filed on Sep. 30, 2019, now Pat. No. 11,516,855.

(30) Foreign Application Priority Data

Aug. 23, 2019   (CN) ......................... 201910784657.4

(51) Int. Cl.
*H04W 74/08* (2024.01)
*H04L 7/02* (2006.01)
(Continued)

(52) U.S. Cl.
CPC ............. *H04W 74/085* (2013.01); *H04L 7/02* (2013.01); *H04L 47/62* (2013.01); *H04L 69/32* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 4,596,011 A | 6/1986 | Kobayashi et al. | |
| 4,701,909 A | 10/1987 | Kavehrad et al. | |

(Continued)

FOREIGN PATENT DOCUMENTS

| | | | |
|---|---|---|---|
| CN | 1426650 A | 6/2003 | |
| CN | 1547860 A | 11/2004 | |

(Continued)

OTHER PUBLICATIONS

Chinese Office Action and Search Report from Chinese Application No. 201910784657.4, dated Nov. 30, 2021, 13 pages.

(Continued)

*Primary Examiner* — Yemane Mesfin
*Assistant Examiner* — Jeff Banthrongsack
(74) *Attorney, Agent, or Firm* — TraskBritt

(57) ABSTRACT

On or more examples relate, generally, to an apparatus that includes a reconciliation sublayer of a physical layer, a reduced media independent interface (RMII) of the physical layer, and a logic circuit. Such a logic circuit may operate to receive a changed carrier sense signal provided by the reconciliation sublayer, generate a further changed carrier sense signal at least partially responsive to a prediction that the changed carrier sense signal would cause unintended signaling at the RMII, and provide the further changed carrier sense signal to the RMII.

10 Claims, 11 Drawing Sheets

(51) Int. Cl.
*H04L 47/62* (2022.01)
*H04L 69/32* (2022.01)
*H04L 69/324* (2022.01)
*H04W 74/0833* (2024.01)

(56) References Cited

U.S. PATENT DOCUMENTS

| | | |
|---|---|---|
| 4,739,276 A | 4/1988 | Graube |
| 4,970,466 A | 11/1990 | Bolles et al. |
| 5,134,377 A | 7/1992 | Reddy et al. |
| 5,305,459 A | 4/1994 | Rydel |
| 5,335,226 A | 8/1994 | Williams |
| 5,357,145 A | 10/1994 | Segaram |
| 5,381,348 A | 1/1995 | Ernst et al. |
| 5,581,556 A | 12/1996 | Ohie |
| 5,784,573 A | 7/1998 | Szczepanek et al. |
| 5,859,554 A | 1/1999 | Higashisaka et al. |
| 5,892,893 A | 4/1999 | Hanf et al. |
| 6,029,202 A | 2/2000 | Frazier et al. |
| 6,067,408 A | 5/2000 | Runaldue et al. |
| 6,115,831 A | 9/2000 | Hanf et al. |
| 6,185,195 B1 | 2/2001 | Leung |
| 6,192,422 B1 | 2/2001 | Daines et al. |
| 6,215,816 B1 | 4/2001 | Gillespie et al. |
| 6,459,739 B1 | 10/2002 | Vitenberg |
| 6,463,543 B1 | 10/2002 | Alvarez |
| 6,479,983 B1 | 11/2002 | Ebiya |
| 6,633,577 B1 | 10/2003 | Nyu |
| 6,691,241 B1 | 2/2004 | Taylor |
| 6,735,217 B1 | 5/2004 | Webber et al. |
| 6,920,132 B1 | 7/2005 | Lo |
| 6,973,094 B1 | 12/2005 | Holloway et al. |
| 7,110,423 B1 | 9/2006 | Sethuram et al. |
| 7,319,705 B1 | 1/2008 | Wu et al. |
| 7,420,986 B1 | 9/2008 | Howard et al. |
| 7,558,348 B1 | 7/2009 | Liu et al. |
| 7,808,247 B1 | 10/2010 | Lo |
| 7,906,973 B1 | 3/2011 | Orr |
| 8,243,752 B2 | 8/2012 | Barkan et al. |
| 8,935,125 B1 | 1/2015 | Fu et al. |
| 9,454,212 B1 | 9/2016 | Schulze |
| 9,628,082 B1 | 4/2017 | Smith et al. |
| 9,696,361 B1 | 7/2017 | Sun et al. |
| 10,102,693 B1 | 10/2018 | Wu |
| 10,684,977 B1 | 6/2020 | Seger et al. |
| 10,863,386 B1 | 12/2020 | Anand et al. |
| 11,121,782 B2 | 9/2021 | Zang et al. |
| 11,197,322 B2 | 12/2021 | Iyer et al. |
| 11,218,964 B2 | 1/2022 | Chae et al. |
| 2002/0162038 A1 | 10/2002 | Bullman et al. |
| 2003/0061341 A1 | 3/2003 | Loh et al. |
| 2003/0126486 A1 | 7/2003 | Bui |
| 2003/0200306 A1 | 10/2003 | Park et al. |
| 2003/0225802 A1 | 12/2003 | Ruthstein et al. |
| 2003/0226050 A1* | 12/2003 | Yik .............. G06F 1/3209 713/324 |
| 2004/0028164 A1 | 2/2004 | Jiang et al. |
| 2004/0047367 A1 | 3/2004 | Mammen |
| 2004/0145500 A1 | 7/2004 | Huebl |
| 2004/0240598 A1 | 12/2004 | Yin |
| 2004/0251912 A1 | 12/2004 | Pharn et al. |
| 2005/0058452 A1 | 3/2005 | Kramer et al. |
| 2005/0063116 A1 | 3/2005 | Rotheroe |
| 2005/0078683 A1 | 4/2005 | Page |
| 2005/0128826 A1 | 6/2005 | Kwack et al. |
| 2006/0007991 A1 | 1/2006 | Wang et al. |
| 2006/0109784 A1 | 5/2006 | Weller et al. |
| 2006/0152261 A1 | 7/2006 | Lance |
| 2006/0181283 A1 | 8/2006 | Wajcer et al. |
| 2006/0209710 A1 | 9/2006 | Watanabe |
| 2006/0222129 A1 | 10/2006 | Hadzic et al. |
| 2007/0008011 A1 | 1/2007 | Thurston |
| 2007/0013411 A1 | 1/2007 | Asaduzzaman et al. |
| 2007/0069768 A1 | 3/2007 | Hatooka et al. |
| 2007/0121624 A1 | 5/2007 | Kimbrough et al. |
| 2007/0133586 A1 | 6/2007 | Ojard et al. |
| 2007/0160087 A1 | 7/2007 | Findlater et al. |
| 2008/0024178 A1 | 1/2008 | Kim et al. |
| 2008/0037693 A1 | 2/2008 | Andrus et al. |
| 2008/0117810 A1 | 5/2008 | Stott et al. |
| 2008/0159330 A1 | 7/2008 | Deng et al. |
| 2008/0162682 A1 | 7/2008 | Ramachandran et al. |
| 2008/0186996 A1 | 8/2008 | Powell et al. |
| 2009/0003835 A1 | 1/2009 | Arahira |
| 2009/0080459 A1 | 3/2009 | Barkan et al. |
| 2009/0201936 A1 | 8/2009 | Dumet et al. |
| 2010/0164505 A1 | 7/2010 | Breed et al. |
| 2010/0202436 A1 | 8/2010 | Albert et al. |
| 2010/0246693 A1 | 9/2010 | Ushio et al. |
| 2010/0322105 A1 | 12/2010 | Diab |
| 2011/0022699 A1 | 1/2011 | Powell et al. |
| 2011/0028104 A1 | 2/2011 | Giombanco et al. |
| 2011/0051601 A1 | 3/2011 | Linsky et al. |
| 2011/0170476 A1 | 7/2011 | Shapira et al. |
| 2012/0087662 A1 | 4/2012 | Suzuki et al. |
| 2012/0155476 A1 | 6/2012 | Pavani et al. |
| 2012/0229214 A1 | 9/2012 | Kasanyal |
| 2012/0300710 A1 | 11/2012 | Li et al. |
| 2012/0307637 A1 | 12/2012 | Diab |
| 2013/0007480 A1 | 1/2013 | Wertheimer et al. |
| 2013/0021063 A1 | 1/2013 | Kwon |
| 2013/0101058 A1 | 4/2013 | Hummel |
| 2013/0159489 A1 | 6/2013 | Cha et al. |
| 2013/0162300 A1 | 6/2013 | Liu et al. |
| 2013/0229926 A1 | 9/2013 | Lu et al. |
| 2013/0329773 A1 | 12/2013 | Cheng et al. |
| 2014/0073352 A1 | 3/2014 | Aldana et al. |
| 2014/0133496 A1 | 5/2014 | Sugiura et al. |
| 2014/0177653 A1 | 6/2014 | Tzeng |
| 2014/0268141 A1 | 9/2014 | Pariseau |
| 2014/0269758 A1 | 9/2014 | Sutterlin et al. |
| 2014/0281626 A1 | 9/2014 | Younger et al. |
| 2015/0063375 A1 | 3/2015 | Tzeng et al. |
| 2015/0124797 A1 | 5/2015 | Babitch et al. |
| 2015/0131708 A1 | 5/2015 | Cornett et al. |
| 2015/0145563 A1 | 5/2015 | Pardoen |
| 2015/0145581 A1 | 5/2015 | Palmer et al. |
| 2015/0205339 A1 | 7/2015 | Park et al. |
| 2015/0237178 A1 | 8/2015 | Zhang |
| 2015/0370312 A1 | 12/2015 | Desposito et al. |
| 2016/0094362 A1 | 3/2016 | Brennan |
| 2016/0156458 A1 | 6/2016 | Babitch et al. |
| 2016/0323287 A1 | 11/2016 | Kishikawa et al. |
| 2016/0337138 A1 | 11/2016 | Gardner et al. |
| 2017/0046298 A1 | 2/2017 | Yu et al. |
| 2017/0048887 A1 | 2/2017 | Feng |
| 2017/0111069 A1 | 4/2017 | Dafesh et al. |
| 2017/0134152 A1 | 5/2017 | Yamamoto et al. |
| 2017/0187479 A1 | 6/2017 | Yamamoto et al. |
| 2017/0214513 A1 | 7/2017 | Asada et al. |
| 2017/0222685 A1 | 8/2017 | Khan et al. |
| 2017/0257273 A1 | 9/2017 | Li et al. |
| 2017/0308946 A1 | 10/2017 | Bursey |
| 2017/0310541 A1 | 10/2017 | Jin |
| 2017/0346620 A1 | 11/2017 | Bucci et al. |
| 2018/0034658 A1 | 2/2018 | Kinage et al. |
| 2018/0062821 A1 | 3/2018 | Mamidwar et al. |
| 2018/0091251 A1 | 3/2018 | Hanneman, Jr. |
| 2018/0165056 A1 | 6/2018 | Lay et al. |
| 2018/0181525 A1 | 6/2018 | Iyer et al. |
| 2018/0220161 A1 | 8/2018 | Schierl et al. |
| 2018/0227015 A1 | 8/2018 | Mccormack et al. |
| 2018/0262526 A1 | 9/2018 | Jain et al. |
| 2018/0314285 A1 | 11/2018 | Susanto et al. |
| 2018/0331776 A1 | 11/2018 | Wang et al. |
| 2019/0133512 A1 | 5/2019 | Elia et al. |
| 2019/0179398 A1 | 6/2019 | Arora et al. |
| 2019/0199537 A1 | 6/2019 | Seo et al. |
| 2019/0230705 A1 | 7/2019 | Beruto et al. |
| 2019/0261420 A1* | 8/2019 | Pannell .............. H04W 74/0825 |
| 2019/0268452 A1 | 8/2019 | Yu et al. |
| 2019/0268941 A1 | 8/2019 | Axer et al. |
| 2019/0313446 A1 | 10/2019 | Kim et al. |
| 2019/0342394 A1 | 11/2019 | Mccann et al. |

(56) References Cited

U.S. PATENT DOCUMENTS

| | | |
|---|---|---|
| 2019/0357146 A1 | 11/2019 | Kim et al. |
| 2019/0361711 A1 | 11/2019 | Kim et al. |
| 2019/0363991 A1 | 11/2019 | Sostawa et al. |
| 2019/0385057 A1 | 12/2019 | Litichever et al. |
| 2020/0067727 A1 | 2/2020 | Pannell |
| 2020/0136993 A1 | 4/2020 | Yun et al. |
| 2020/0145263 A1 | 5/2020 | Gotz |
| 2020/0153174 A1 | 5/2020 | Curtis et al. |
| 2020/0295957 A1 | 9/2020 | Kim et al. |
| 2020/0343993 A1 | 10/2020 | Rentschler et al. |
| 2020/0351943 A1 | 11/2020 | Iyer et al. |
| 2020/0367096 A1 | 11/2020 | Hwang et al. |
| 2020/0371579 A1 | 11/2020 | Selvam et al. |
| 2021/0055963 A1 | 2/2021 | An et al. |
| 2021/0056060 A1 | 2/2021 | An et al. |
| 2021/0058168 A1 | 2/2021 | Zang et al. |
| 2021/0058177 A1 | 2/2021 | Iyer et al. |
| 2021/0058224 A1 | 2/2021 | Iyer et al. |
| 2021/0058269 A1 | 2/2021 | Zang et al. |
| 2021/0058498 A1 | 2/2021 | Iyer et al. |
| 2021/0058965 A1 | 2/2021 | Chen et al. |
| 2021/0067907 A1 | 3/2021 | Sze et al. |
| 2021/0282087 A1 | 9/2021 | Den Besten |
| 2021/0303050 A1 | 9/2021 | Ching et al. |
| 2022/0046114 A1 | 2/2022 | Entelis et al. |

FOREIGN PATENT DOCUMENTS

| | | |
|---|---|---|
| CN | 101127928 A | 2/2008 |
| CN | 101566665 A | 10/2009 |
| CN | 101616048 A | 12/2009 |
| CN | 102017778 A | 4/2011 |
| CN | 1866803 B | 5/2012 |
| CN | 102813530 A | 12/2012 |
| CN | 102891702 A | 1/2013 |
| CN | 204392278 U | 6/2015 |
| CN | 105681148 A | 6/2016 |
| CN | 106031098 A | 10/2016 |
| CN | 106603310 A | 4/2017 |
| CN | 107836131 A | 3/2018 |
| CN | 108173703 A | 6/2018 |
| CN | 108781091 A | 11/2018 |
| CN | 108981781 A | 12/2018 |
| CN | 115685034 A | 2/2023 |
| DE | 102018105007 A1 | 9/2019 |
| DE | 112019002669 T5 | 3/2021 |
| DE | 112020002093 T5 | 1/2022 |
| EP | 0620664 | 10/1994 |
| EP | 1388975 A1 | 2/2004 |
| EP | 1940086 A1 | 7/2008 |
| EP | 2779535 A1 | 9/2014 |
| EP | 2816501 A1 | 12/2014 |
| EP | 3094044 A1 | 11/2016 |
| EP | 3573287 A1 | 11/2019 |
| EP | 3618364 A1 | 3/2020 |
| GB | 1351654 A | 5/1974 |
| JP | 58-131848 A | 8/1983 |
| JP | 59-158148 A | 9/1984 |
| JP | S63-304727 A | 12/1988 |
| JP | 01-260949 A | 10/1989 |
| JP | H03-006944 A | 1/1991 |
| JP | 04-072937 A | 3/1992 |
| JP | H0766739 A | 3/1995 |
| JP | H8116323 A | 5/1996 |
| JP | 2002-507365 A | 3/2002 |
| JP | 2003-125024 A | 4/2003 |
| JP | 2003-318911 A | 11/2003 |
| JP | 2004-517558 A | 6/2004 |
| JP | 2005-136979 A | 5/2005 |
| JP | 2005-531953 A | 10/2005 |
| JP | 2007-028619 A | 2/2007 |
| JP | 2007-521758 A | 8/2007 |
| JP | 2008-039532 A | 2/2008 |
| JP | 2009-021651 A | 1/2009 |
| JP | 2009-219021 A | 9/2009 |
| JP | 2010-226406 A | 10/2010 |
| JP | 2011-052936 A | 3/2011 |
| JP | 2011-193039 A | 9/2011 |
| JP | 2013-024614 A | 2/2013 |
| JP | 2013-527643 A | 6/2013 |
| JP | 2013-200687 A | 10/2013 |
| JP | 2015-126303 A | 7/2015 |
| JP | 2018-042019 A | 3/2018 |
| NL | 7113537 A | 4/1972 |
| RU | 2020570 C1 | 9/1994 |
| WO | 1994/016303 A1 | 7/1994 |
| WO | 2018/075482 A1 | 4/2018 |
| WO | 2018/136116 A1 | 7/2018 |

OTHER PUBLICATIONS

Fitzgerald: "10BASE-T1L Low Power Idle (802.3cg D2.0)", IEEE-SA, Acuitas Silicon, (Aug. 15, 2018) 9 pages.

International Search Report from International Application No. PCT/US2020/070342, mailed Nov. 11, 2020, 5 pages.

International Written Opinion from International Application No. PCT/US2020/070342, mailed Nov. 11, 2020, 8 pages.

LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.

Meier, "Analysis of Worst Case Latencies in an 10 Mbit Ethernet network with PLCA", IEEE Draft, V4, Jan. 17, 2018, pp. 1-11.

Microsoft. "P." Microsoft Computer Dictionary, 5th ed., Penguin Books, 2002. (Year: 2002).

Pannell et al., "Quality of Service for PLCA", NXP, May 2018 (May 24, 2018), pp. 1-37, vol. 802.1, No. v02 24, Pittsburg.

U.S. Appl. No. 16/587,505, filed Sep. 30, 2019, titled "Detecting Collisions on a Network", to Zang et al., 34 pages.

U.S. Appl. No. 16/587,583, filed Sep. 30, 2019, titled "Interface for Improved Media Access, and Related Systems, Methods, and Devices", to Chen et al., 51 pages.

U.S. Appl. No. 16/588,562, filed Sep. 30, 2019, titled "Transceiver and Driver Architecture With Low Emission and High Interference Tolerance", to An et al., 36 pages.

U.S. Appl. No. 16/588,714, filed Sep. 30, 2019, titled "Diagnosing Cable Faults Within a Network", to Zang et al., 40 pages.

U.S. Appl. No. 16/591,294, filed Oct. 2, 2019, titled "Wake Detection at Controller for Physical Layer of Single Pair Ethernet Network, and Related Systems, Methods and Devices", to An et al., 31 pages.

U.S. Appl. No. 16/653,688, filed Oct. 15, 2019, titled "Physical Layer to Link Layer Interface and Related Systems, Methods and Devices", to Iyer et al., 32 pages.

U.S. Appl. No. 16/684,419, filed Nov. 14, 2019, titled "Ethernet Interface and Related Systems Methods and Devices", to Iyer et al., 23 pages.

U.S. Appl. No. 16/684,428, filed Nov. 14, 2019, titled "Ethernet Interface and Related Systems Methods and Devices", to Iyer et al., 30 pages.

U.S. Appl. No. 16/843,648, filed Apr. 8, 2020, titled "Emulating Collisions in Wired Local Area Networks and Related Systems, Methods, and Devices", to Iyer et al., 53 pages.

U.S. Appl. No. 62/881,720, filed Aug. 1, 2019, titled "Single Pair Ethernet Physical Layer Architecture and Systems, Devices, and ME I HODS for Implementing the Same", to Iyer et al., 35 pages.

U.S. Appl. No. 62/993,825, filed Mar. 24, 2020, titled "Low Pin Count Handshake Signaling Protocol According to 10BASE-T1X Local and Remote Wake DE I ECT and Related Systems, ME I HODS, and Devices", to Iyer et al., 13 pages.

Zimmerman et al., "IEEE P802.3cg 10Mb/s Single Pair Ethernet: a guide", Long Beach, CA, USA, Jan. 16, 2019. (Year: 2019).

Chinese First Office Action and Search Report for Chinese Patent Application Serial No. 201910784058.2, issued Nov. 7, 2023, 40 pages with English translation.

(56) References Cited

OTHER PUBLICATIONS

Chinese First Office Action for Chinese Application No. 201910784565.6, dated Sep. 8, 2023, 27 pages with English translation.
Chinese First Office Action for Chinese Application No. 201910785140.7, dated May 31, 2023, 17 pages with English translation.
Chinese First Office Action for Chinese Application No. 202210842861.9, dated Aug. 30, 2023, 15 pages with English translation.
Chinese Office Action and Search Report from Chinese Application No. 201910784382.4, dated Mach 3, 2022, 19 pages.
Chinese Office Action and Search Report from Chinese Application No. 201910784580.0, dated Mar. 7, 2022, 18 pages.
Chinese Office Action and Search Report from Chinese Application No. 201910785147.9, dated Oct. 29, 2021, 11 pages.
Chinese Second Office Action for Chinese Application No. 201910784382.4, dated Sep. 16, 2022, 5 pages with translation.
Chinese Second Office Action for Chinese Application No. 201910785140.7, dated Oct. 25, 2023, 10 pages with English translation.
German Office Action from German Application No. 112020002209.9, dated Mar. 17, 2022, 34 pages.
International Search Report for International Application No. PCT/US2020/027275, mailed Jun. 26, 2020, 6 pages.
International Search Report from International Application No. PCT/US2020/0070350, mailed Oct. 30, 2020, 4 pages.
International Search Report from International Application No. PCT/US2020/0070363, mailed Nov. 10, 2020, 5 pages.
International Search Report from International Application No. PCT/US2020/0070367, mailed Oct. 27, 2020, 5 pages.
International Search Report from International Application No. PCT/US2020/070343, mailed Jan. 13, 2021, 7 pages.
International Search Report from International Application No. PCT/US2020/070345, mailed Nov. 12, 2020, 5 pages.
International Search Report from International Application No. PCT/US2020/070347, mailed Nov. 16, 2020, 4 pages.
International Search Report from International Application No. PCT/US2020/070366, mailed Nov. 24, 2020, 4 pages.
International Search Report from International Application No. PCT/US2021/070305, mailed Aug. 5, 2021, 7 pages.
International Written Opinion for International Application No. PCT/US2020/027275, mailed Jun. 26, 2020, 10 pages.
International Written Opinion from International Application No. PCT/US2020/0070350, mailed Oct. 30, 2020, 8 pages.
International Written Opinion from International Application No. PCT/US2020/0070363, mailed Nov. 10, 2020, 9 pages.
International Written Opinion from International Application No. PCT/US2020/0070367, mailed Oct. 27, 2020, 5 pages.
International Written Opinion from International Application No. PCT/US2020/070343, mailed Jan. 13, 2021, 10 pages.
International Written Opinion from International Application No. PCT/US2020/070345, mailed Nov. 12, 2020, 8 pages.
International Written Opinion from International Application No. PCT/US2020/070347, mailed Nov. 16, 2020, 11 pages.
International Written Opinion from International Application No. PCT/US2020/070366, mailed Nov. 24, 2020, 7 pages.
International Written Opinion from International Application No. PCT/US2021/070305, mailed Aug. 5, 2021, 12 pages.
Invitation to Pay Additional Fees from International Application No. PCT/US2021/070305, mailed Jun. 15, 2021, 15 pages.
Korean Notice of Provisional Rejection for Korean Application No. 10-2022-7009593, dated Jul. 4, 2023, 17 pages with English translation.
Korean Request for the Submission of an Opinion for Korean Patent Application No. 10-2022-7005572, mailed Jan. 26, 2024, 21 pages with English translation.
Microchip KSZ8061MNX/MNG, "100BASE-T/100BASE-TX Physical Layer Transceiver" Device Document 00002038D (Aug. 15, 2018) 66 pages.
Notice of Reasons for Refusal for Japanese Patent Application No. 2022-510900, issued Sep. 5, 2023, 10 pages with English translation.

The Second Office Action of Chinese Patent Application No. 202210842861.9, issued Feb. 9, 2024, 15 pages with English translation.
Draft Standard for Ethernet Amendment 4: Physical Layer Specifications and Management Parameters for 10Mb/s Operation and Associated Power Delivery over a Single Balanced Pair of Conductors, LAN/MAN Standards Committee of the IEEE Computer Society, IEEE P802.3cg, Jul. 18, 2019, pp. 1-3, 234, 235.
IEEE Draft Standard for Ethernet—Amendment 4: Physical Layer Specifications and Management Parameters for 10 Mb/s Operation and Associated Power Delivery over a Single Balanced Pair of Conductors, LAN/MAN Standards Committee of IEEE Computer Society, Jul. 18, 2019, 5 pages.
Notice of Reasons for Refusal of Japanese Patent Application No. 2022-510903, mailed Jun. 18, 2024, 12 pages with English translation.
Notice of Reasons for Refusal of Japanese Patent Application No. 2022-510905, issued Jul. 2, 2024, 12 pages with English translation.
Notice of Reasons for Refusal of Japanese Patent Application No. 2022-510907, issued Jul. 2, 2024, 12 pages with English translation.
Second Office Action of Chinese Patent Application No. 201910784565.6, issued Jun. 8, 2024, 24 pages with English translation.
Beruto, Piergiorgio et al., 802.3cg draft 2.0 PLCA (Clause 148) Overview, IEEE 802,3 Plenary Meeting, Jul. 9, 2018, 23 pages.
Japanese Notice of Reasons for Refusal of Japanese Patent Application No. 2022-557156, mailed Apr. 16, 2024, 4 pages with English translation.
Korean Request for the Submission of an Opinion of Korean Application No. 10-2021-7037128, issued Feb. 16, 2024, 10 pages with English translation.
Korean Request for the Submission of an Opinion of Korean Patent Application No. 10-2022-7007012, issued Feb. 23, 2024, 12 pages with English translation.
Notice of Reasons for Refusal of Japanese Patent Application No. 2021-565015, issued Apr. 30, 2024, 5 pages with English translation.
Notification to Grant Patent Right for Invention and Search Report of Chinese Patent Application No. 201910784058.2, issued May 1, 2024, 11 pages with English translation.
Qiming et al., Power cable partial discharge fault location based on high-speed sampling device, Electronic Technology Applications, vol. 41, Issue 8, 2015, pp. 70-75, 8 total pages with English translation.
Notice of Reasons for Refusal of Japanese Patent Application No. 2022-510899, mailed Jul. 30, 2024, 8 pages with English translation.
Notice of Reasons for Refusal of Japanese Patent Application No. 2022-510908, issued Aug. 6, 2024, 15 pages with English translation.
Notice of Reasons for Refusal of Japanese Patent Application No. 2022-510909, issued Jul. 16, 2024, 8 pages with English translation.
Request for the Submission of an Opinion of Korean Patent Application No. 10-2022-7005576, issued Aug. 7, 2024, 12 pages with English translation.
Request for the Submission of an Opinion of Korean Patent Application No. 10-2022-7007928, mailed Aug. 19, 2024, 11 pages with English translation.
Request for the Submission of an Opinion of Korean Patent Application No. 10-2022-7009586, issued Aug. 26, 2024, 11 pages with English translation.
Request for the Submission of an Opinion of Korean Patent Application No. 10-2022-7009587, issued Jun. 20, 2024, 21 pages with English translation.
Request for the Submission of an Opinion of Korean Patent Application No. 10-2022-7009588, mailed Aug. 27, 2024, 11 pages with English translation.
Decision of Refusal of Japanese Patent Application No. 2022-510903, mailed Dec. 24, 2024, 8 pages with English translation.
Decision on Rejection of Chinese Patent Application No. 201910784565.6, mailed Oct. 17, 2024, 24 pages with English translation.

* cited by examiner

CHANGING CARRIER SENSE SIGNAL GENERATED BY A RECONCILIATION SUBLAYER OF A PHYSICAL LAYER THAT MAY CAUSE UNINTENDED SIGNALING AT A REDUCED MEDIA INDEPENDENT INTERFACE (RMII)

CROSS-REFERENCE TO RELATED APPLICATIONS

This application is a continuation of U.S. patent application Ser. No. 16/587,583, filed Sep. 30, 2019, now U.S. Pat. No. 11,516,855, issued Nov. 29, 2022, which claims the benefit of the filing date of Chinese Patent Application Serial No. 201910784657.4, filed Aug. 23, 2019, the disclosure of which is hereby incorporated herein in its entirety by this reference.

TECHNICAL FIELD

Disclosed embodiments relate, generally, to physical layer devices, and more specifically, some embodiments relate to media access tuning at a single pair Ethernet physical layer device.

BACKGROUND

Interconnects are widely used to facilitate communication among devices of a network. Generally speaking, electrical signals are transmitted on a physical medium (e.g., a bus, a coaxial cable, or a twisted pair—but generally referred to simply as a "line") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer that operates according to packet signaling. While the data link layer may include one or more sublayers, in Ethernet-based computer networking, a data link layer typically includes at least a media access control (MAC) layer that provides control abstraction of the physical layer. By way of example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical and data link layers (among others). The Peripheral Component Interconnect (PCI) standard and the Parallel Advanced Technology Attachment (Parallel ATA), both around since the early 1990's, implement a multidrop bus topology. The trend since the early 2000's has been to use point-to-point bus topologies, for example, the PCI Express standard and the Serial ATA (SATA) standard implement point-to-point topologies.

A typical point-to-point bus topology may implement lines between each device (e.g., dedicated point-to-point) or lines between devices and switches (e.g., switched point-to-point). However, in a multidrop topology the physical medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multidrop topologies due, in part, to the greater number of links between devices. In certain applications, such as automotive, there may be physical constraints that make it difficult to directly connect devices, and so a topology that does not require, or does not require as many, direct connections (e.g., a multidrop topology) in a network or a sub-network may be less susceptible to such constraints.

Devices that are on a baseband network share the same physical transmission medium, and typically use the entire bandwidth of that medium for transmission. As a result, only one device on a baseband network may transmit at a given instant. So, media access control methods are used to handle contention for a shared transmission medium.

In bus network topologies where the physical transmission medium is shared, one technique used to avoid collisions (i.e., when two or more devices try to transmit on the shared bus at the same time) is carrier-sense multiple access (CSMA), which is a MAC protocol performed at the data link layer. According to CSMA, a node verifies the absence of other traffic before transmitting on the shared bus. More specifically, a node checks for a carrier on the common bus and if it detects a carrier then it waits until no carrier is detected (i.e., the channel is idle) before beginning transmission. CSMA is sometimes extended to include collision detection (CSMA/CD) whereby a node attempts to avoid collision as well as detects and responds to collisions that occur while it is transmitting.

Another option is to implement collision avoidance in the PHY. Physical layer collision avoidance (PLCA) is a technique whereby a PHY only transmits frames received from a MAC during an assigned transmit opportunity. By way of example, transmit opportunities may be allocated according to a scheduling scheme (e.g., round robin, weighted round robin, deficit round robin, first-in-first-out, priority based, or precision time protocol (PTP) scheduling of multi-level queues). In such a scenario, at a given transmit opportunity, only the PHY that owns that particular transmit opportunity is permitted/expected to send data. 10SPE (i.e., 10 Mbps Single Pair Ethernet) is a network technology currently under specification of IEEE 802.3cg™, and the 10SPE specification includes an optional PLCA reconciliation sublayer, which, in theory, may be used to avoid collisions on a multidrop bus.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
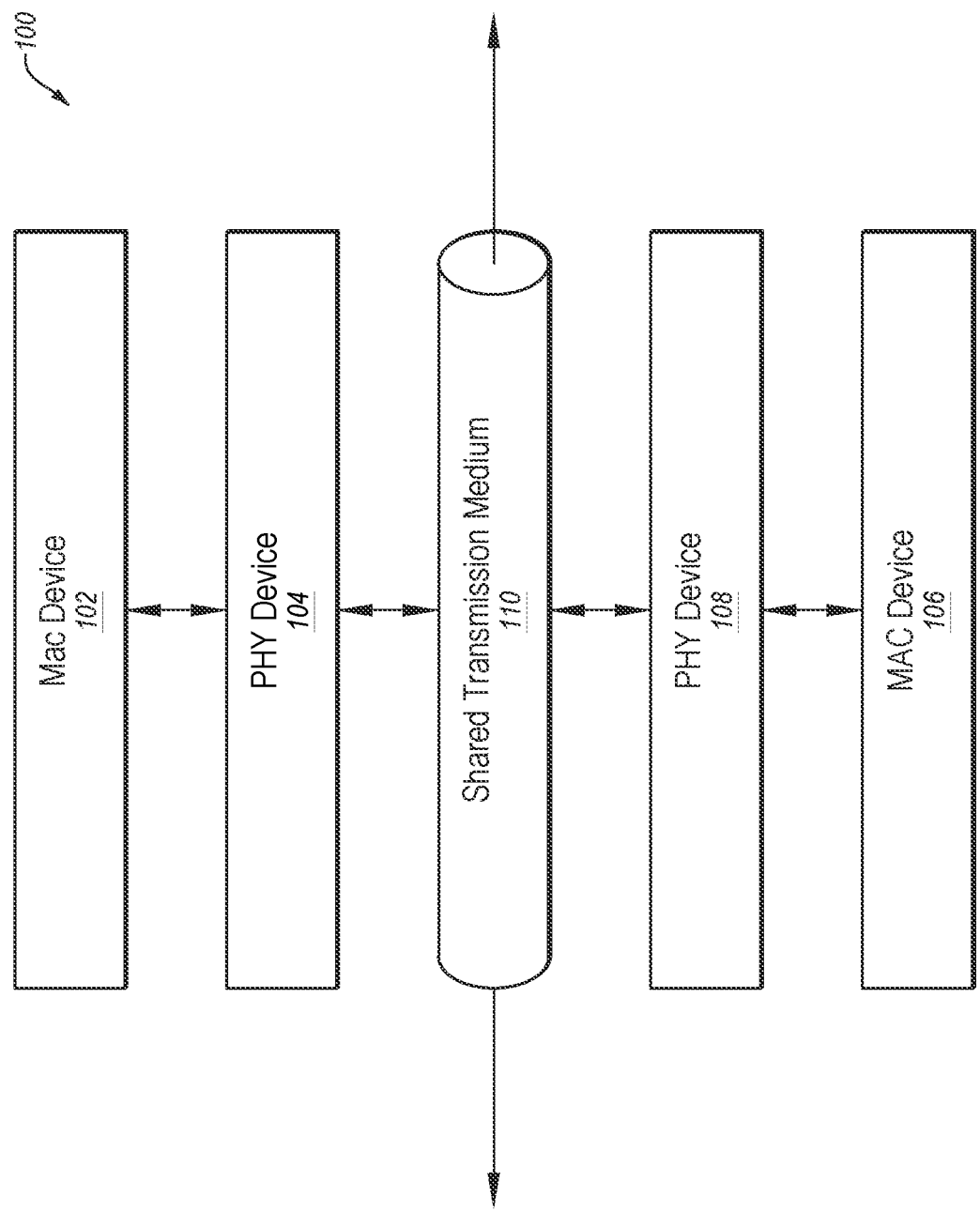
FIG. 1 is a block diagram that illustrates a multidrop network in accordance with one or more embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, "buffer" means a region of physical memory used to temporarily store data. As a non-limiting example, buffers may be used to temporarily store data while it is being moved from one location to another location (e.g., in memory, in a system, in a network) or one device to another device. A buffer of disclosed embodiments may implement an algorithm such as first-in-first-out (FIFO). A buffer of disclosed embodiments may or may not adjust timing by design, that is, data may be written to memory at a first rate and data may be read from the memory at a second rate, the first rate and second rate being the same or different.

It is often desirable to use a simplified interface that reduces the number of connections between a PHY and a MAC. A technique for reducing multiple data connections is to multiplex the signals onto one line and use a higher clock frequency. A similar technique may be used for control signals; however, assumptions often have to be made about which control signals are needed/used at a given time under given conditions.

Reduced Media Independent Interface™ ("RMII™" or "RMI interface") is an example of a simplified interface sometimes used to connect a PHY to a MAC. The RMII Consortium Specification (Rev. 1.2 released Mar. 20, 1998) provides for an additional reconciliation layer on an IEEE 802.3 Media Independent Interface (MII) specification. RMII provides for collapsing carrier sense (CRS) and a receive data valid (DV) signals onto one pin (which carries signal CRS_DV). RMII further provides that CRS_DV should be asserted by the PHY whenever a carrier is sensed on a receive medium (i.e., the receive medium is non-idle). The DV signal indicates to a MAC that incoming data (i.e., incoming to the MAC) on an RXD[1:0] (a receive data pin of the MAC) is valid data.

CRS and DV are typically multiplexed to one signal appearing on a single pin on alternate clock cycles. For example, a 10BASE-T network or a 100BASE-X network the multiplexed signal may alternate at 2.5 MHz (10 Mb/s mode) or 25 MHz (100 b/s mode), respectively.

RMII provides that loss of carrier at a receive medium results in the de-assertion of CRS_DV. If the PHY has additional bits to be presented onto RXD[1:0] following the initial de-assertion of CRS_DV, then the PHY asserts CRS_DV on cycles of REF_CLK which present the second di-bit of each nibble and de-assert CRS_DV on cycles of REF_CLK which present the first di-bit of a nibble.

RMII also provides that data on the receive line (RXD [1:0]) is considered valid once CRS_DV is asserted, however, since assertion of CRS_DV is asynchronous relative to the reference clock, a "no valid data present symbol" (e.g., a 2-byte zero or "00") is inserted at RXD[1:0] until proper receive signal decoding takes place. So, both the no valid data present symbol on RXD[1:0] and de-asserted CRS_DV may be used by an RMII MAC to infer that a medium is idle; asserted CRS_DV and no data valid present symbols on RXD[1:0] may be used by an RMII MAC to infer that a receive is about to start; and an asserted CRS_DV and a change from a no valid data present symbol to another symbol (e.g., a preamble byte) may be used by an RMII MAC to infer that valid data is incoming.

RMII also provides for an elastic buffer on a receive line to account for differences between a recovered clock for receive data with a local clock (i.e., it aligns the clocks), and so permits domain crossing.

For data transmissions, RMII assumes that a transmit enable (TX_EN) pin is an accurate indication of transmit, and that a MAC can infer a collision from TX_EN (TX_EN is asserted by the MAC synchronously with the first nibble of the preamble of the first transmit frame) and recovered CRS (i.e., recovered from CRS_DV)—asserted CRS indicates that the receive medium is active.

The inventors of this disclosure appreciate that it would be advantageous if a simplified interface such as RMII could be used to communicate between a CSMA/CD MAC and a PHY configured to perform media access tuning, as non-limiting examples, according to PLCA, time aware protocols, traffic shaping, and/or combinations of the same.

When a PHY implements media access tuning, certain internal signals are sometimes emulated. For example, media access tuning circuitry may generate an emulated signal based on internal logic instead of faithfully replicating (i.e., propagating) an internal signal, for example, because it is trying to cause certain behavior at the link layer.

An emulated signal for the carrier sense signal (i.e., the signal that indicates the presence or lack thereof of a carrier on a shared transmission medium), which determines the assertion/de-assertion of CRS_DV at an RMI interface, may sometimes interfere with correct operation of a CSMA/CD MAC, an RMI interface, or both. Stated another way, sometimes differences between an emulated signal generated by a media access tuning circuitry and an internal signal that was emulated will interfere with correct operation of an RMII MAC, RMI interface, or both.

Moreover, RMII was written for a network topology with separate transmission mediums for receive and transmit (either two distinct lines or one line with two signals superimposed on one line). According to RMII, an asserted carrier sense signal means that there is an active carrier on a receive medium. As described herein, media access tuning protocols described in this disclosure assume that an asserted carrier sense signal means that there is an active carrier on the shared transmission medium—and do not draw a distinction between a medium for receive and a medium for transmit.

One or more embodiments of this disclosure relate, generally, to managing signaling between media access tuning circuitry and an RMI interface to ensure correct operation of RMI interface, a CSMA/CD MAC that is communicated with via an RMI interface, or both.

As used herein the term "asserting" used in connection with a signal is intended to encompass a signal transitioning to an active state, a signal in an active state, and a signal transitioning to an active state and then being in an active state. As used herein the term "de-asserting" used in connection with a signal is intended to encompass a signal transitioning to an in-active state, a signal in an in-active state, and a signal transitioning to an in-active state and then being in an in-active state. As non-limiting examples, for a pin that is active high, if asserted a signal would appear that is a logic high (e.g., 3.3 volts or 5 volts, without limitation) and if de-asserted a signal would appear that is logic low (e.g., 0 volts, without limitation). Other arrangements are within the scope of the disclosure such as active-low.

FIG. 1 shows a functional block diagram of a multidrop network 100 including at least two media access control (MAC) devices, MAC device 102, and MAC device 106. As non-limiting examples, multidrop network 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation) system, elevator system or sub-system, public transit control system (e.g., for above ground train, below ground train, trolley, or bus, without limitation), an automobile system or automobile sub-system, or an industrial control system, without limitation.

PHY device 104 and PHY device 108 are configured to interface shared transmission medium 110 with MAC device 102 and MAC device 106, respectively. As non-limiting examples, PHY device 108 and PHY device 104 may be chip packages including memory and/or logic configured for carrying out all or portions of embodiments described herein.

Shared transmission medium 110 is a physical medium that is a communication path for nodes that are part of multidrop network 100, including nodes that include MAC device 102 and MAC device 106.

In the embodiment shown in FIG. 1, PHY device 104 and PHY device 108 are configured to manage access to shared transmission medium 110 (e.g., according to PLCA, time aware protocols, or traffic shaping protocols) and MAC device 102 and MAC device 106 are configured to implement collision detection (e.g., according to CSMA/CD or CSMA). PHY device 104 and PHY device 108 are configured to provide signaling (as described more fully herein) to ensure correct operation of MAC device 102 and MAC device 106, respectively. Moreover, PHY device 104 and PHY device 108 communicate with MAC device 102 and MAC device 106, respectively, via respective RMI interfaces.

Figure 2:
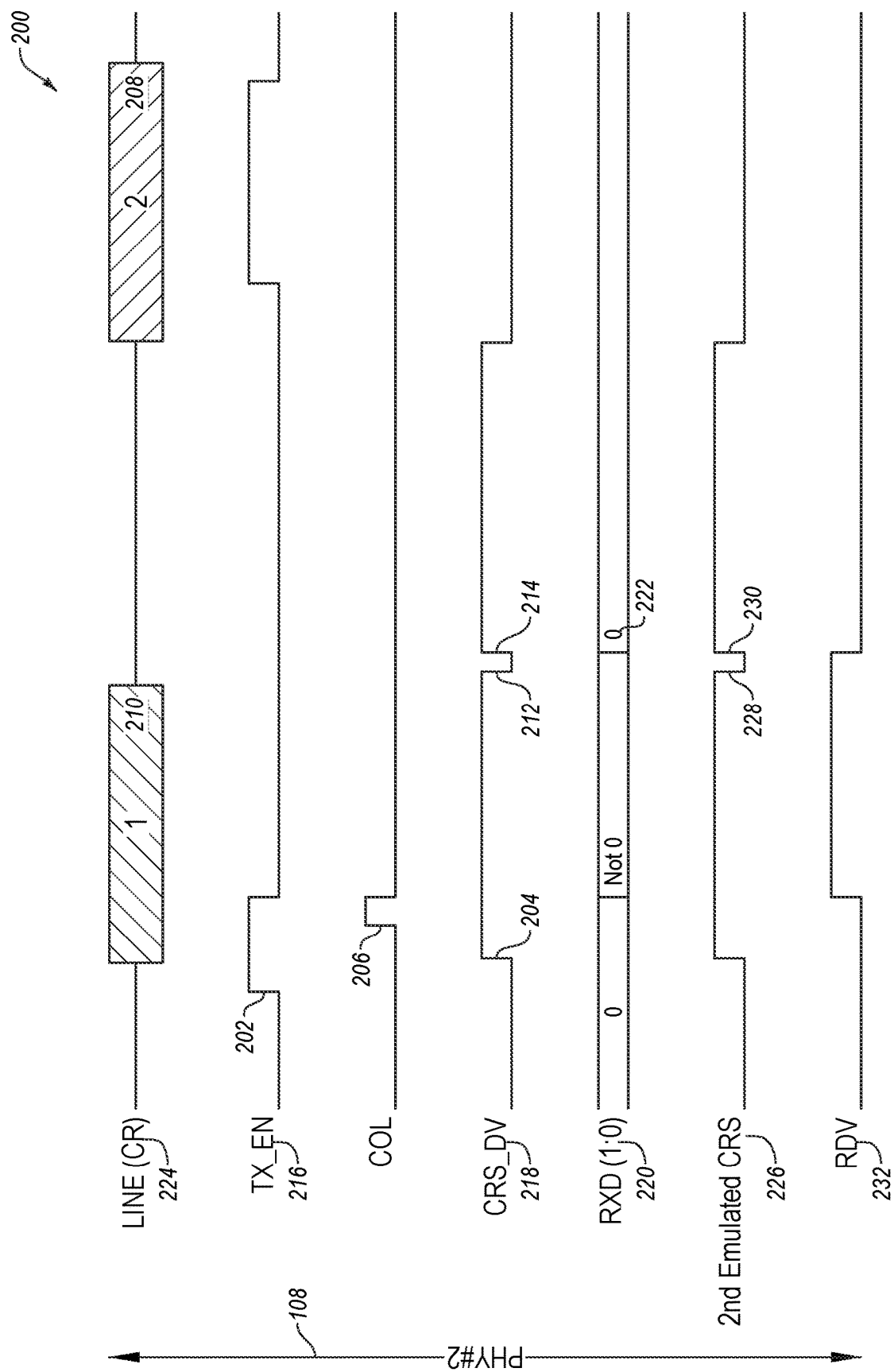
FIG. 2 is a timing diagram that illustrates a collision handling process at a physical layer device in accordance with one or more embodiments of the disclosure.
Figure 3A:
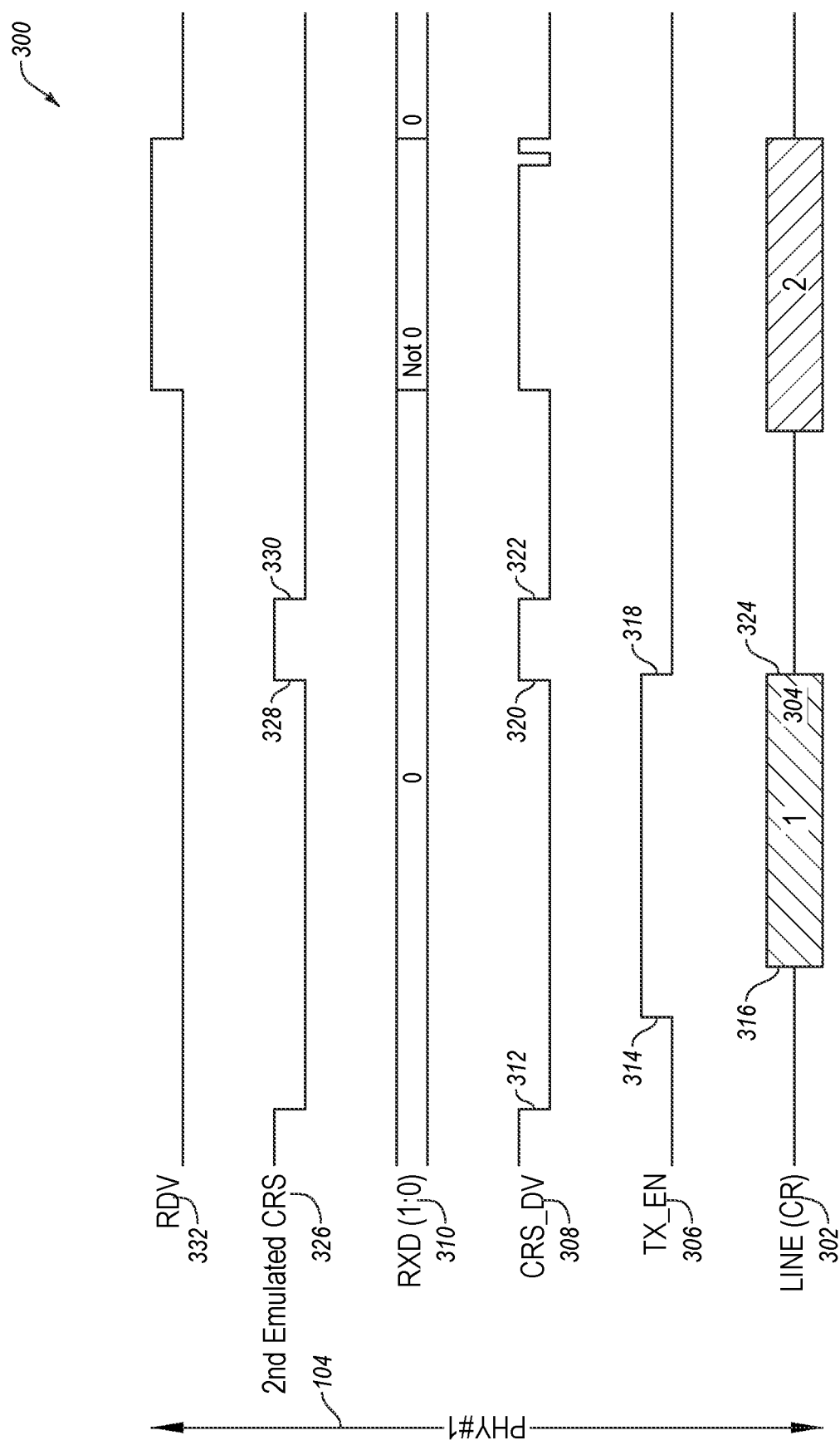
FIG. 3A is a timing diagram that illustrates a data transmission at a physical layer device in accordance with one or more embodiments of the disclosure.
Figure 3B:
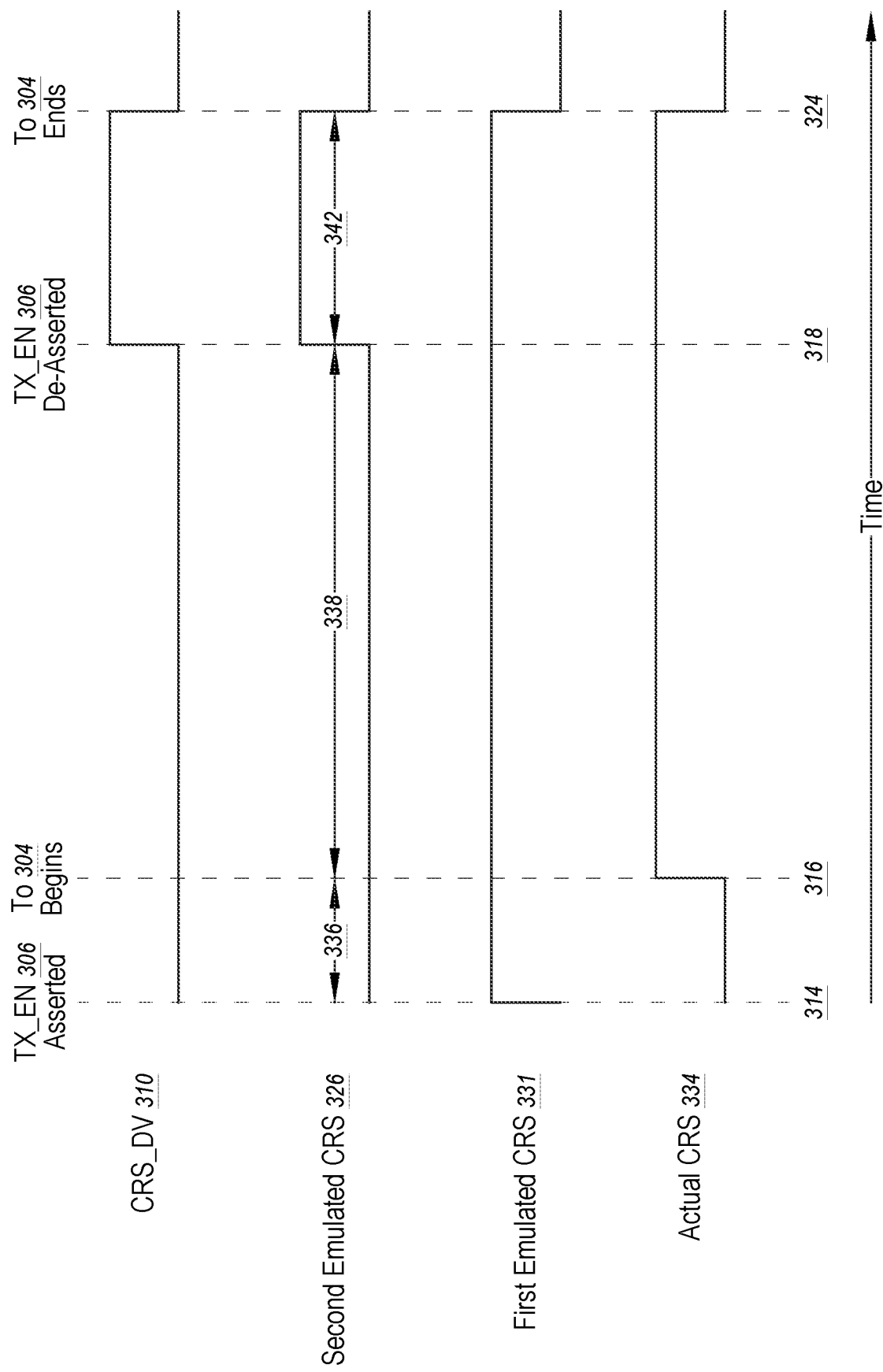
FIG. 3B is a timing diagram that illustrates a set of signals for the data transmission of FIG. 3A, in accordance with one or more embodiments of the disclosure.
Figure 4:
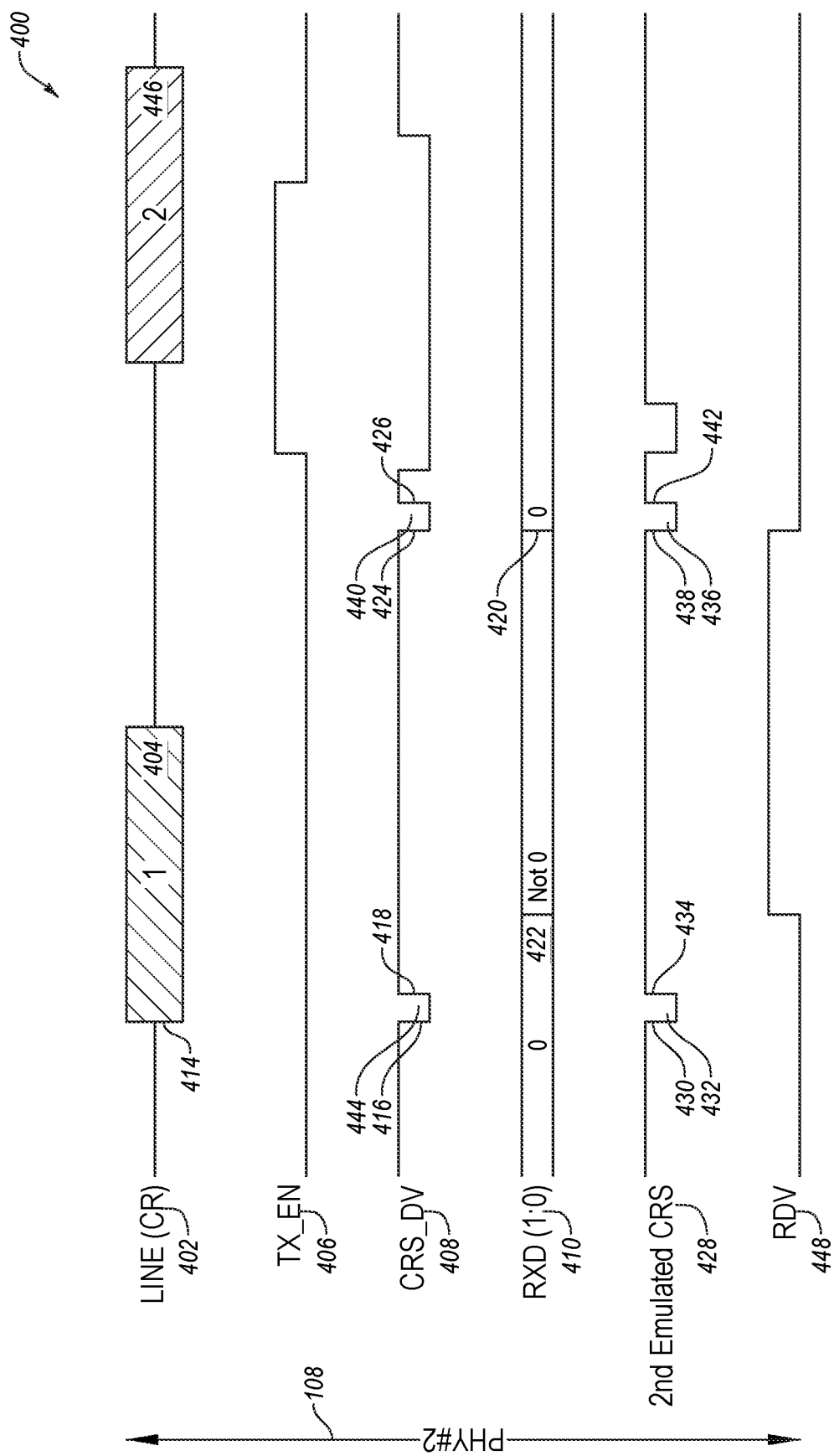
FIG. 4 is a timing diagram that illustrates a data reception at a physical layer device in accordance with one or more embodiments of the disclosure.

FIG. 2, FIG. 3, and FIG. 4 are timing diagrams that show signals asserted at pins of respective RMI interfaces of PHY device 104 and PHY device 108 during example processes. Specifically, FIG. 2, FIG. 3, FIG. 3B, and FIG. 4 show signals asserted for transmit enable (TX_EN), emulated carrier sense (CRS), data valid (RDV), (CRS_DV), and receive data (RXD[1:0] or just "RXD"). In the case of PHY device 108, a signal at a collision pin (COL) is also shown in FIG. 2 that is internal to PHY device 108. Moreover, a signal for a second emulated carrier sense (second emulated CRS) is shown that is internal to PHY devices 104 and 108, and corresponds, for example, to second emulated carrier sense signal 522 of FIG. 5.

In FIGS. 2, 3, and 4, "no valid data present" symbols (here, a "0") are placed on the RXD lines 220 (FIG. 2), 310 (FIG. 3), and 410 (FIG. 4) while PHY devices 104 and 108 are not conveying receive data or preamble symbols to MAC devices 102 and 106, respectively. Also shown is a signal for receive data valid (RDV), in particular, signal RDV 232 (FIG. 2), RDV 332 (FIG. 3), and RDV 448 (FIG. 4), each an internal signal to PHY device 104 or 108, as the case may be. The RDV signal is shown to illustrate when a DV portion of CRS_DV is asserted. In some embodiments an RDV signal may be generated internally and used to generate a CRS_DV signal. In other embodiments, a PHY device 104 and 108 may be configured to monitor RXD and de-assert a DV portion of CRS_DV in response to a no valid data present symbol and assert a DV portion of CRS_DV in response to detecting valid data is present.

One of ordinary skill will understand that unless specific timing considerations are noted herein with respect to specific embodiments, changes to timing shown and described with reference to FIGS. 2, 3, 3A and 4 may be made without departing form the scope of the embodiments described in this disclosure and their legal equivalents.

FIG. 2 shows a detailed timing diagram of an embodiment of a process 200 for performing media access tuning during a data reception after detecting a collision at a PLCA PHY. In the operations contemplated by FIG. 2, PHY device 108 is a PLCA PHY and it detects a collision when its MAC device 106 attempts to transmit during transmit opportunity 210. After detecting the collision, PHY device 108 receives data from data transmission from PHY device 104.

At time 202, TX_EN 216 is asserted at PHY device 108.

At time 204, PHY device 108 asserts CRS_DV 218 in response to detecting a carrier at line 224 (time 204 substantially corresponds to a start time of transmit opportunity 210), as reflected by signal RDV 232 being asserted. At time 206, PHY device 108 detects a collision as shown by assertion of internal signal COL. PHY device 108 continues to assert CRS_DV 218 while receiving data. At time 212, PHY device 108 detects an end of the receive data received during transmit opportunity 210, and signal RDV 232 is de-asserted.

PHY device 108 is configured to detect the end of the receive data based on detecting a carrier going idle (i.e., a transition from active to idle on the line 224). At time 212, PHY device 108 de-asserts CRS_DV 218 for a period of time and then re-asserts CRS_DV 218 to form a gap 214 in CRS_DV 218.

The gap 214 on CRS_DV 218 indicates an end of valid data (i.e., it is an "end of valid data signal") that is detectable by a CSMA/CD MAC. In one embodiment, a gap width is selected for the gap 214 that has a short enough period that a CSMA/CD MAC will not start a data transmission.

In one embodiment, the gap 214 in CRS_DV 218 is generated responsive to a gap 230 being formed starting at time 228 in second emulated CRS 226. In one embodiment, gap 230 is formed at time 228 in response to a first emulated CRS signal (not shown) that was generated by media access tuning circuitry of the PHY device 108 configured for PLCA. The second emulated CRS 226 (i.e., the signal including the gap) is provided to the RMI interface of PHY device 108. The RMI interface generates the gap 214 in CRS_DV 218 to indicate to the MAC device 106 the end of the data reception and, together with a no valid data present symbol 222 (a zero "0" in FIG. 2) on RXD 220, the end of the receive data. In one embodiment, a width of gap 230 is chosen so that gap 214 generated in CRS_DV 218 in response to gap 230 is short enough that a CSMA/CD MAC will not start a data transmission.

After inserting the end of valid data indicator at CRS_DV 218, i.e., the gap 214, PHY device 108 continues to assert CRS_DV 218 until the beginning of transmit opportunity 208 at time 228, which is PHY device 108's next transmit opportunity. In one embodiment, CRS_DV 218 is asserted because second emulated CRS 226 is being asserted, so an RMI interface of PHY device 108 infers an active carrier at line 224. Further, PHY device 108 inserts a no valid data present symbol 222 (here, a "0") while waiting to start transmit opportunity 208 and second emulated CRS 226 is asserted.

FIG. 3A shows a detailed timing diagram of a process 300 for performing media access tuning during a data transmission, in accordance with disclosed embodiments. In the operation contemplated by FIG. 3, PHY device 104 is a PLCA PHY, and it is handling a transmit by a CSMA/CD MAC.

At time 312, PHY device 104 de-asserts CRS_DV 308 after detecting that there is no carrier on line 302. At time 314, TX_EN 306 is asserted (e.g., by MAC device 102) at PHY device 104. Notably, transmit opportunity 304, which is PHY device 104's next transmit opportunity, does not start till time 316. In this embodiment, PHY device 104 includes delay lines (described later herein) for transmit data, and so even through TX_EN 306 is asserted at time 314, PHY device 104 does not start moving transmit data to line 302 until time 316 (i.e., the beginning of transmit opportunity 304).

As mentioned above, RMII was written for a network with separate transmission mediums for receive and transmit (either two distinct lines or one line with two signals superimposed on one line). An "active" medium, according to RMII, means that a receive medium is active. If PLCA circuitry generates an asserted CRS that is propagated as CRS_DV 308 by an RMII to an RMII MAC, the RMII MAC would interpret an asserted CRS_DV 308 at time 314 to mean that a receive medium is active and would infer a collision. So, in disclosed embodiments, PHY device 104 may be configured to suppress an asserted emulated CRS (not shown in FIG. 3A) generated by PLCA while waiting for a transmit opportunity to begin. In the example shown in FIG. 3A, this occurs between time 314 when TX_EN is asserted and time 318 when TX_EN de-asserted.

FIG. 3B shows CRS_DV 308 and second emulated CRS 326 of FIG. 3A together with first emulated CRS 331 and actual CRS 334 between times 314 and 324, i.e., between assertion of TX_EN 306 and the end of transmit opportunity 304. In the embodiment shown in FIG. 3B, actual CRS 334 corresponds to a carrier sense signal generated by carrier sense circuitry monitoring a shared transmission medium (such as carrier sense signal 518 of FIG. 5). In order to simplify the description, timing labels for assertion and de-assertion of TX_EN 306 and transmit opportunity 304 of line 302 are shown in FIG. 3B and used in the related description.

At time 314, PLCA of PHY device 104 generates an asserted emulated CRS 331 in response to TX_EN 306 being asserted in order to indicate to the CSMA/CD MAC that line 302 is active (i.e., to trick the CSMA/CD MAC into believing that transmit data is being moved to line 302), which the PLCA assumes the CSMA/CD MAC will ignore for collision handling purposes. During time period 336, i.e., from time 314 to time 316, PHY device 104 suppresses PLCA emulated CRS 331 from being transmitted to MAC device 102—or stated another way, PHY device 104 generates a de-asserted second emulated CRS 326 during time period 336, and so CRS_DV 310, which is asserted/de-asserted responsive to second emulated CRS 326, is also de-asserted during time period 336. At time 316, actual CRS 334 is asserted in response to PHY device 104 moving transmit data to line 302 at the start of transmit opportunity 304. PLCA emulated CRS 331 continues to be asserted at time 316 and remains asserted until PHY device 104 finishes moving transmit data to line 302 at time 324—i.e., the end of transmit opportunity 304. During time period 338, i.e., from time 316 to time 318, PHY device 104 suppresses PLCA emulated CRS 331 from being transmitted to MAC device 102 to avoid the CSMA/CD MAC inferring a collision, which may also be characterized as suppressing actual CRS 334 from being transmitted to MAC device 102. In response to second emulated CRS 326 being de-asserted during time period 336 and time period 338, CRS_DV 310 is de-asserted from time 314 to time 318 (when TX_EN 306 is asserted). Turning back to FIG. 3B, at time 318, TX_EN 306 is de-asserted, indicating that the MAC device 102 is finished providing transmit data to PHY device 104. Notably, PHY device 104 does not finish moving transmit data to line 302 until time 324, i.e., the end of transmit opportunity 304. So, in response to detecting that TX_EN 306 is de-asserted (i.e., transitions from high to low) at time 318 and in response to detecting data still waiting to be sent at a transmit delay line, PHY device 104 "pulses" CRS_DV 308 from time 320 to time 322 (i.e., asserts CRS_DV 308 at time 320 and then de-asserts CRS_DV 308 at time 322), which substantially corresponds to the period of time from time 318, when the MAC de-asserts TX_EN 306, to time 324, when PHY device 104 finishes moving transmit frames to line 302.

In one embodiment, as shown in FIGS. 3A and 3B, PHY device 104 pulses CRS_DV 308 in response to second emulated CRS 326 being asserted from time 328 to time 330 (FIG. 3A). The time period during which second emulated CRS 326 is asserted is shown in FIG. 3B as time period 342, the time period from time 318 to time 324.

As shown in FIG. 3B, second emulated CRS 326 is pulsed during time period 342 in response to TX_EN 306 being de-asserted at time 318 and transmit data remaining in a transmit delay line. Pulsing CRS_DV 308 signals to a CSMA/CD MAC of MAC device 102 that beginning another transmit would cause a collision at line 302, and so the collision avoidance logic at such a MAC device 102 prevents it from starting another transmit while CRS_DV 308 is high.

At time 320, when CRS_DV 308 is asserted, no data valid symbol (here, "0" symbols) are inserted at RXD 310—otherwise a CSMA/CD MAC might start a data reception and start receiving its own data. As noted above, and using the example operation shown in FIG. 3B, pursuant to RMII, a MAC would look for a transition from "00" to "not 00" in conjunction with an asserted CRS_DV to start a data reception.

FIG. 4 shows a detailed timing diagram of a media access process 400, in accordance with one or more embodiments of the disclosure. In the scenario shown in FIG. 4, PHY device 108 is configured to be time-aware (or to use traffic shaping as described in more detail below), that is, a transmit opportunity of a PHY device 108 is scheduled based on a master clock of the network, by way of non-limiting example, using the precision-time-protocol ("PTP") under specification as IEEE 1588™. Notably, TX_EN 406 is shown for informational purposes, and does not limit the generality of FIG. 4.

In the embodiment shown in FIG. 4, PHY device 108 is configured to keep the MAC in a deferral state by asserting CRS_DV 408 with no valid data present symbol "0" on RXD 410 except during its assigned transmit window, here, transmit window 446, in which case, it should de-assert CRS_DV 410. So, in the example operation contemplated by FIG. 4, PHY device 108 asserts CRS_DV 408 while it awaits a possible receive in transmit window 404 to start at time 414. At time 416, (which substantially corresponds to time 414), PHY device 108, in response to detecting the start of receive frames (e.g., detecting a preamble) de-asserts CRS_DV 408 and then re-asserts CRS_DV 408 at time 418, i.e., creating a gap 444 after a predetermined gap time.

In one embodiment, PHY device 108 generates the gap 444 in CRS_DV 408 at time 416 to time 418 in response to a gap 432 generated at second emulated CRS 428 at time 430 to time 434. More specifically, an RMI interface of PHY device 108 interprets the transition from high-to-low of second emulated CRS 428 at time 430 to mean no active carrier is on line 402 and so de-asserts CRSDV 408. When second emulated CRS 428 is re-asserted at time 434, the RMI interface interprets the transition from low-to-high at time 434 to mean that there is an active carrier on line 402, and so asserts CRS_DV at time 418. A width of the gap 432 generated at second emulated CRS 428 may be chosen such that the width of the gap 444 at CRS_DV 408 is short enough that a MAC will not begin a transmit while CRS_DV 408 is de-asserted.

Notably, the gap 444 from time 416 to time 418, and more specifically the transition from low to high at time 418, is interpreted by a CSMA/CD MAC to mean that, if the "no valid data symbol" 422 changes to another symbol then it (the MAC) may begin a data reception. As a non-limiting example, a CSMA/CD MAC will infer that PHY device 108 may begin sending receive frames (i.e., detects that a data reception might start) in response to the assertion of CRS_DV 408 at time 418 and "00" data on RXD 410, and will infer the start of a data reception when it detects a preamble of a data frame (not shown) on RXD 410. So, a gap 444 beginning at time 416 in CRS_DV 408 enables proper signaling to a CSMA/CD MAC such that the MAC can standby to receive data after having been held in a deferral state by the time-aware PHY device 108.

At time 424, PHY device 108 inserts a gap 440 at CRS_DV 408 at the end of the receive data transfer (i.e., inserts a gap 440 from time 424 to time 426), and RXD 410 is 0 at time 420, which is substantially the same as time 424. In one embodiment, PHY device 108 inserts gap 440 at CRS_DV 408 in response to a gap 442 from time 438 to time 436 being generated at in second emulated CRS 428. An RMI interface of PHY device 108 interprets the gap in second emulated CRS 428 to mean the data reception is ended, and so generates CRS_DV 408 with the gap 440 beginning at time 424 and ending at time 426. Notably, if gap 440 was not inserted at CRS_DV 410 beginning at time 424, a CSMA/CD MAC would continue to receive data on RXD 410. In other words, a MAC would receive the "00" symbols beginning at time 420 as if it were valid data.

The same timing diagram shown in FIG. 4 also applies to a media access process where a PHY device 108 shapes traffic by holding its MAC in a deferral state until a shaping algorithm internal to PHY device 108 (instead of an external PTP based scheduling algorithm) indicates a transmit opportunity for the MAC.

Figure 5:
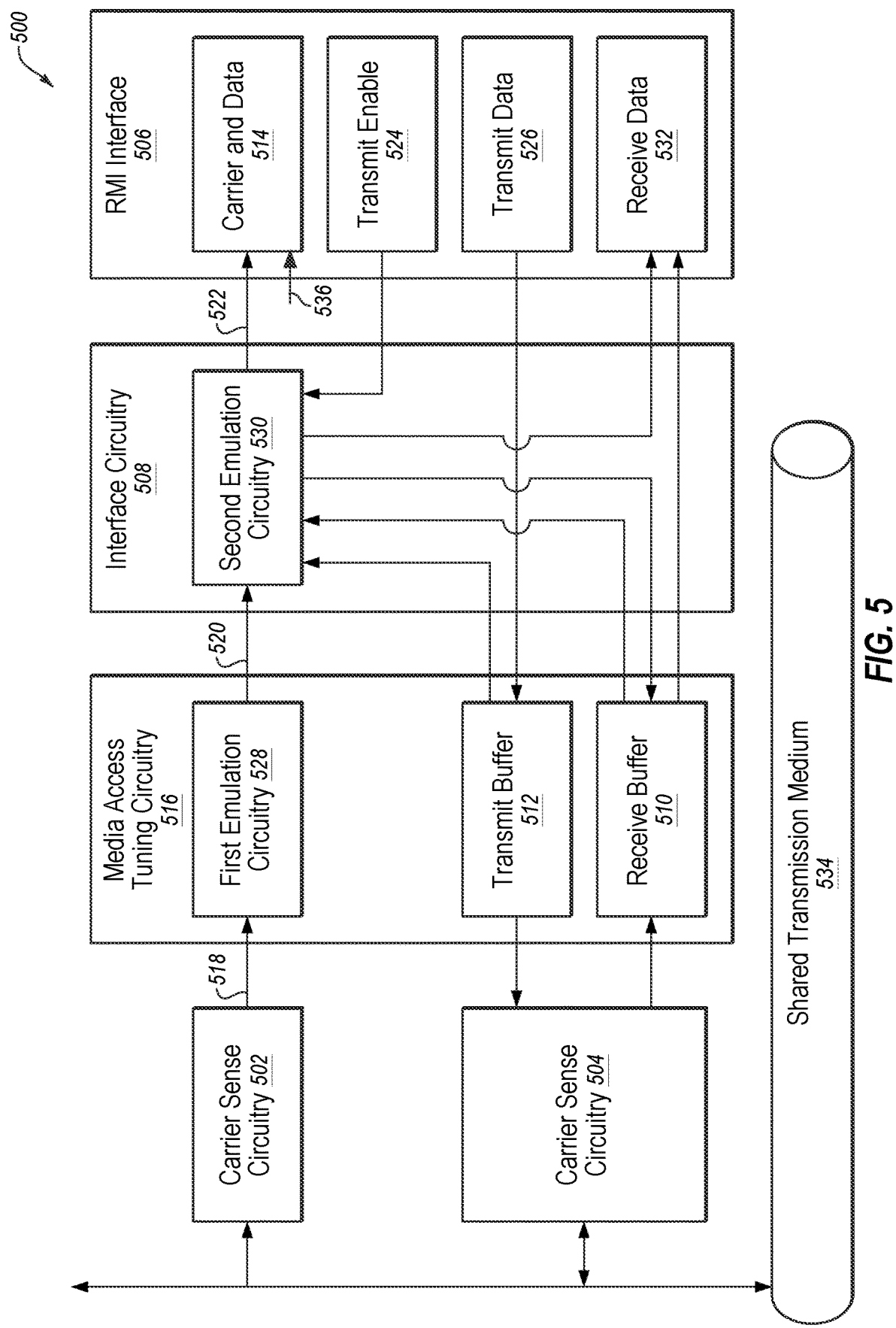
FIG. 5 is a block diagram of physical layer device in accordance with one or more embodiments of the disclosure.

FIG. 5 shows a simplified block diagram of a physical layer system 500 that includes a collision avoidance (CA) interface circuitry—interface circuitry 508—configured, generally, to enable use of media access tuning circuitry 516 with a link layer device, and more specifically, a link layer device that is configured to operate according to CSMA, CSMA CA, CSMA/CD or combination thereof. In the embodiment shown in FIG. 5, physical layer system 500 includes media access tuning circuitry 516, interface circuitry 508, and RMI Interface 506, as well as carrier sense circuitry 502 and transmission circuitry 504. Carrier sense circuitry 502 and transmission circuitry 504 are operatively coupled to shared transmission medium 534.

Media access tuning circuitry 516 may be configured, generally, to perform, among other things, collision handling, traffic shaping, or both. In the embodiment shown in FIG. 5, media access tuning circuitry 516 is configured to manage access (e.g., for transmits and receives) to shared transmission medium 534 according to media access protocols, as non-limiting examples, collision handling protocols, traffic shaping protocols, or both.

In the embodiment shown in FIG. 5, media access tuning circuitry 516 includes first emulation circuitry 528, transmit buffer 512, and receive buffer 510. First emulation circuitry 528 is configured to generate a first emulated carrier sense signal 520 in response to carrier sense signal 518 generated by carrier sense circuitry 502 and applicable media access protocols of media access tuning circuitry 516. In some cases, first emulated carrier sense signal 520 generated by first emulation circuitry 528 may not be a faithful replication of carrier sense signal 518. By way of non-limiting example, media access tuning circuitry 516 may be configured to provide first emulated carrier sense signal 520 at a time when carrier sense signal 518 does not indicate the presence of a carrier on shared transmission medium 534. As a non-limiting example, first emulation circuitry 528 may be configured to generate first emulated carrier sense signal 520 in accordance with a physical layer collision handling protocol whereby first emulated carrier sense signal 520 is provided while waiting for a next assigned transmit window or next transmit opportunity (as the case may be).

Interface circuitry 508 may include second emulation circuitry 530, which is configured to generate a second emulated carrier sense signal 522 in response to first emulated carrier sense signal 520 provided by media access tuning circuitry 516 as well as certain detected conditions related to generating correct signaling at RMI interface 506. Interface circuitry 508 may be configured to add signaling to first emulated carrier sense signal 520, that is, modify first emulated carrier sense signal 520 to include the added signaling. In disclosed embodiments, second emulation circuitry 530 may be configured to monitor media access tuning circuitry 516 and RMI interface 506. In the embodiment shown in FIG. 5, second emulation circuitry 530 is configured to monitor a transmit buffer 512 and a receive buffer 510 of media access tuning circuitry 516, as well as monitor transmit enable 524 of RMI interface 506.

Physical layer system 500 may be configured to send no valid data present symbols to a MAC while physical layer system 500 is not transmitting receive frames or sync frames. In one embodiment, interface circuitry 508 is configured to insert no valid data symbols at receive buffer 510 while physical layer system 500 is not transmitting receive frames or sync frames to its MAC. Interface circuitry 508 may include insertion circuitry for inserting no valid data present symbols to receive buffer 510, as described with reference to FIGS. 2, 3A, 3B and 4. In one embodiment, second emulation circuitry 530 may be configured to insert the no valid data present symbols at receive buffer 510 or, in the alternative, at receive data 532 (the alternative embodiments illustrated in FIG. 5 by dashed-lines from second emulation circuitry 530 to receive buffer 510 and receive data 532).

Second emulation circuitry 530 may be configured to generate a second emulated carrier sense signal 522 in response to detected conditions (i.e., "empty," "buffering," "active," or "in-active," "active to in-active" or "in-active to active," without limitation), or contents (e.g., pre-defined symbols, without limitation) from such monitoring, including to enable correct signaling of RMI interface 506, such as the CRS_DV signals as described with reference to FIG. 2, FIG. 3B and FIG. 4. Additionally or alternatively, second emulation circuitry 530 may be configured to monitor transmit data 526 and receive data 532 in addition to, or in lieu of, monitoring transmit buffer 512 and receive buffer 510, respectively.

RMI interface 506 is configured to receive the second emulated carrier sense signal 522 from interface circuitry 508 and provide it to carrier and data 514. In disclosed embodiments, carrier and data 514 may be associated with an output pin of one or more input/output (I/O) pins of physical layer system 500. The output pin may be associated with carrier sense signals (e.g., CRS_DV) disclosed herein. In one embodiment, RMI interface 506 may include multiplexing circuitry for multiplexing a second emulated carrier sense signal 522 together with a DV signal (shown in FIG. 3 as an input signal 536 to carrier and data 514) at carrier and data 514. In another embodiment, RMI interface 506 may include circuitry for asserting, at carrier and data 514, a CRS signal corresponding to second emulated carrier sense signal 522 and asserting a DV signal on respective alternate clock cycles.

Figure 6:
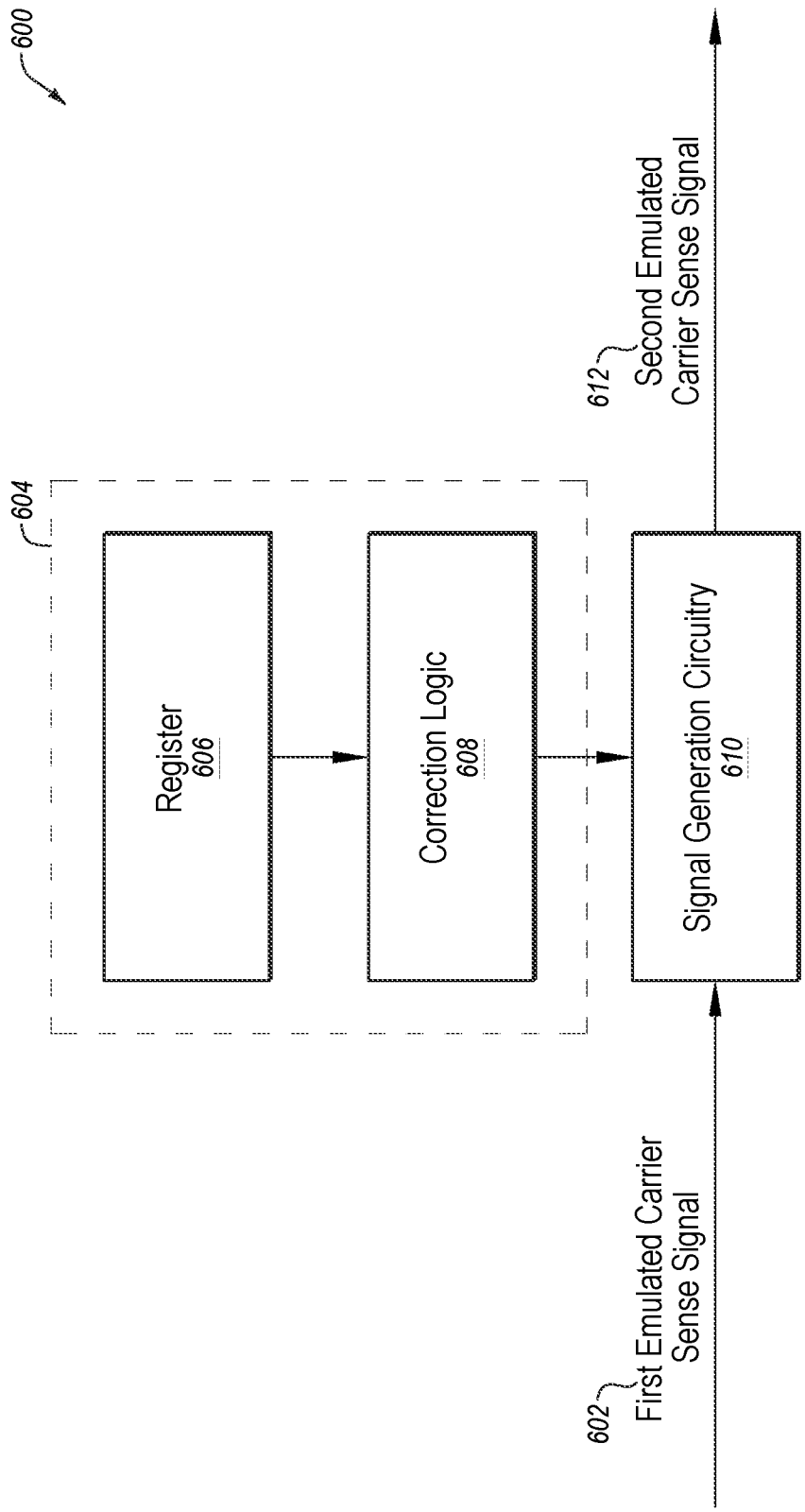
FIG. 6 is a block diagram of emulation circuitry for correcting propagation of emulated signals generated by media access tuning circuitry, in accordance with one or more embodiments of the disclosure.

FIG. 6 shows a functional block diagram of emulation circuitry 600 that, for example, may be an implementation of second emulation circuitry 530 (FIG. 5), in accordance with one or more embodiments of the disclosure. In the embodiment shown in FIG. 6, emulation circuitry 600 includes correction circuitry 604, and control signal generation circuitry 610.

Correction circuitry 604 is configured, generally, to control signal generation circuitry 610 to generate second emulated carrier sense signal 612. Correction logic 608 of correction circuitry 604 may be configured to detect that first emulated carrier sense signal 602 would cause incorrect signaling at, e.g., RMII interface 506, and to control signal generation circuitry 610 to generate second emulated carrier sense signal 612 to correct at least some of the possible errors. Register 606 may be configured to store parameters for detecting conditions and/or for generating second emulated carrier sense signal 612. Parameters for generating second emulated carrier sense signal 612 may include a pre-determined gap size or multiple pre-determined gap sizes for different use cases (for example, the cases described with reference to FIGS. 2, 3, and 4).

In some embodiments, correction logic 608 may be configured based on a type of collision avoidance protocol used in a PHY device that includes emulation circuitry 600. By way of non-limiting example, correction logic 608 may be configured to detect conditions related to media access tuning, collision avoidance, traffic shaping, or combinations thereof. Parameters stored at register 606 may also be selected based on a type of collision avoidance protocol. Further, in some embodiments, register 606 may be re-configurable. By way of non-limiting example, a gap size may be set in advanced to accommodate a standard and then reconfigured later to accommodate a different standard. In one embodiment, register 606 may enable tuning of correction circuitry 604 to characteristics of different devices (e.g., MACs from different suppliers, PHY components from different suppliers or PHYs having different architectures).

Figure 7:
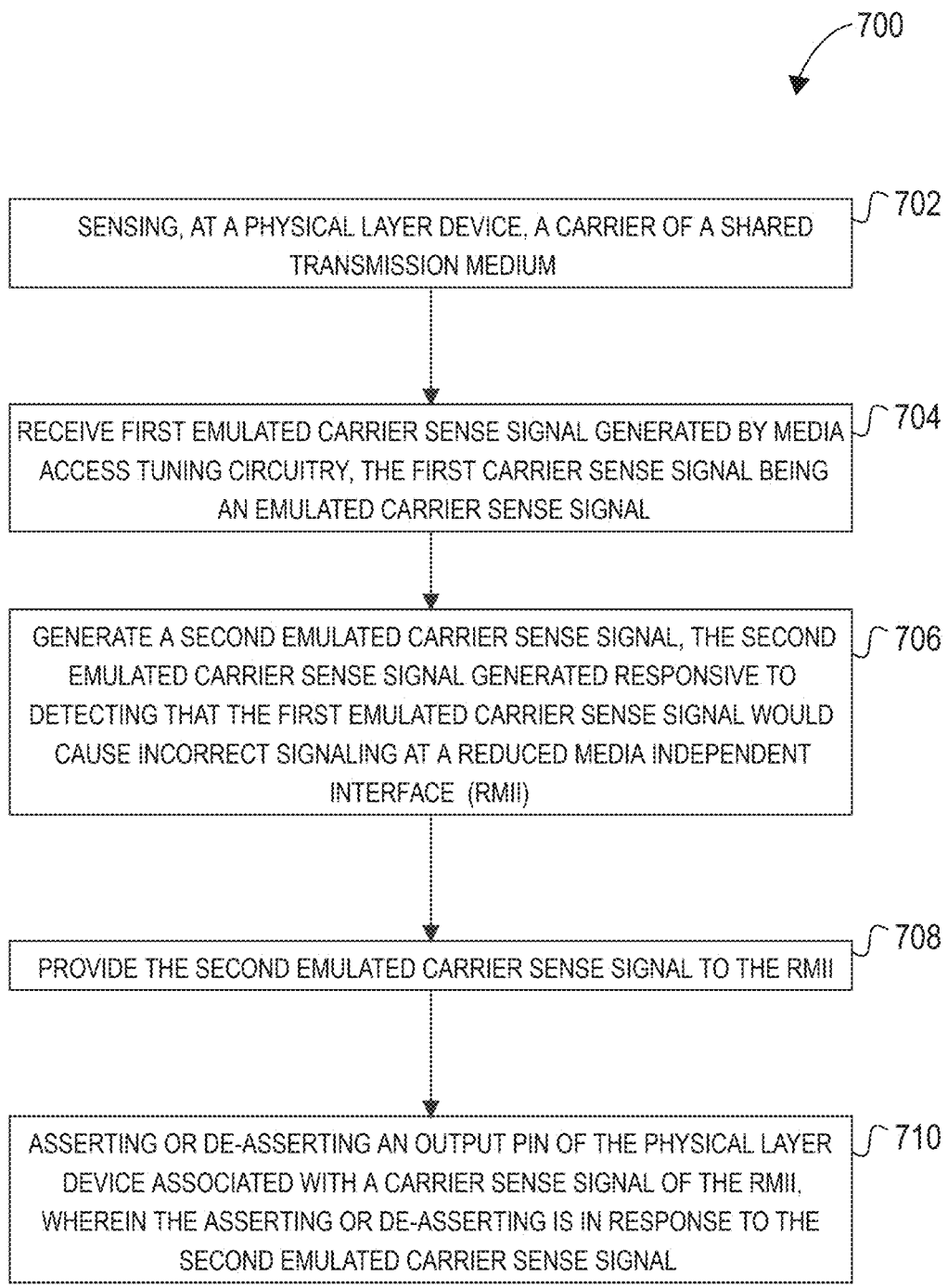
FIG. 7 is a flow chart of a process for managing carrier sense signals, in accordance with one or more embodiments of the disclosure.

FIG. 7 shows a flowchart of a process 700 for managing signaling at a physical layer device, in accordance with one or more embodiments of the disclosure. In operation 702, a carrier of a shared transmission medium is sensed at a physical layer device. In operation 704, a first emulated carrier sense signal is received. The first emulated carrier sense signal is generated by a media access tuning circuitry such as media access tuning circuitry 516 (e.g., which performs PLCA, without limitation). In operation 706, a second emulated carrier sense signal is generated. In various embodiments, the second emulated carrier sense signal may be generated responsive to detecting that the first emulated carrier sense signal would cause incorrect signaling at an RMII. As non-limiting examples, the second carrier sense signal may be generated by modifying a portion of the first emulated carrier sense signal.

In operation 708, the second emulated carrier sense signal is provided to the RMII. In operation 710, an output signal appearing as one of one or more input/output (I/O) pins of the physical layer device is asserted or de-asserted. The output pin may be associated with a carrier sense signal of the RMII. In one embodiment, the output pin is associated with a multiplexed carrier sense and data valid signal (i.e., signal CRS_DV) of an RMII. Such a multiplexed carrier sense and data valid signal may be asserted/de-asserted responsive to the second emulated carrier sense signal provided to the RMII in operation 708.

In disclosed embodiments, second emulated carrier sense signal 522 may be generated using any suitable technique known to those of ordinary skill in the art. As a first non-limiting example, second emulated carrier sense signal 522 may be generated by modifying the first emulated carrier sense signal 520. Modifying a signal may involve modifying another signal, by way of non-limiting example, using filtering techniques. As another non-limiting example, modifying a new signal may involve generating a new signal using the first emulated carrier sense signal as a reference signal. The new signal may be substantially the same as the reference signal in all respects except for modified portions. As a second non-limiting example, the second emulated carrier sense signal may be generated as new signal responsive to logic such as correction logic 608 of FIG. 6.

Figure 8:
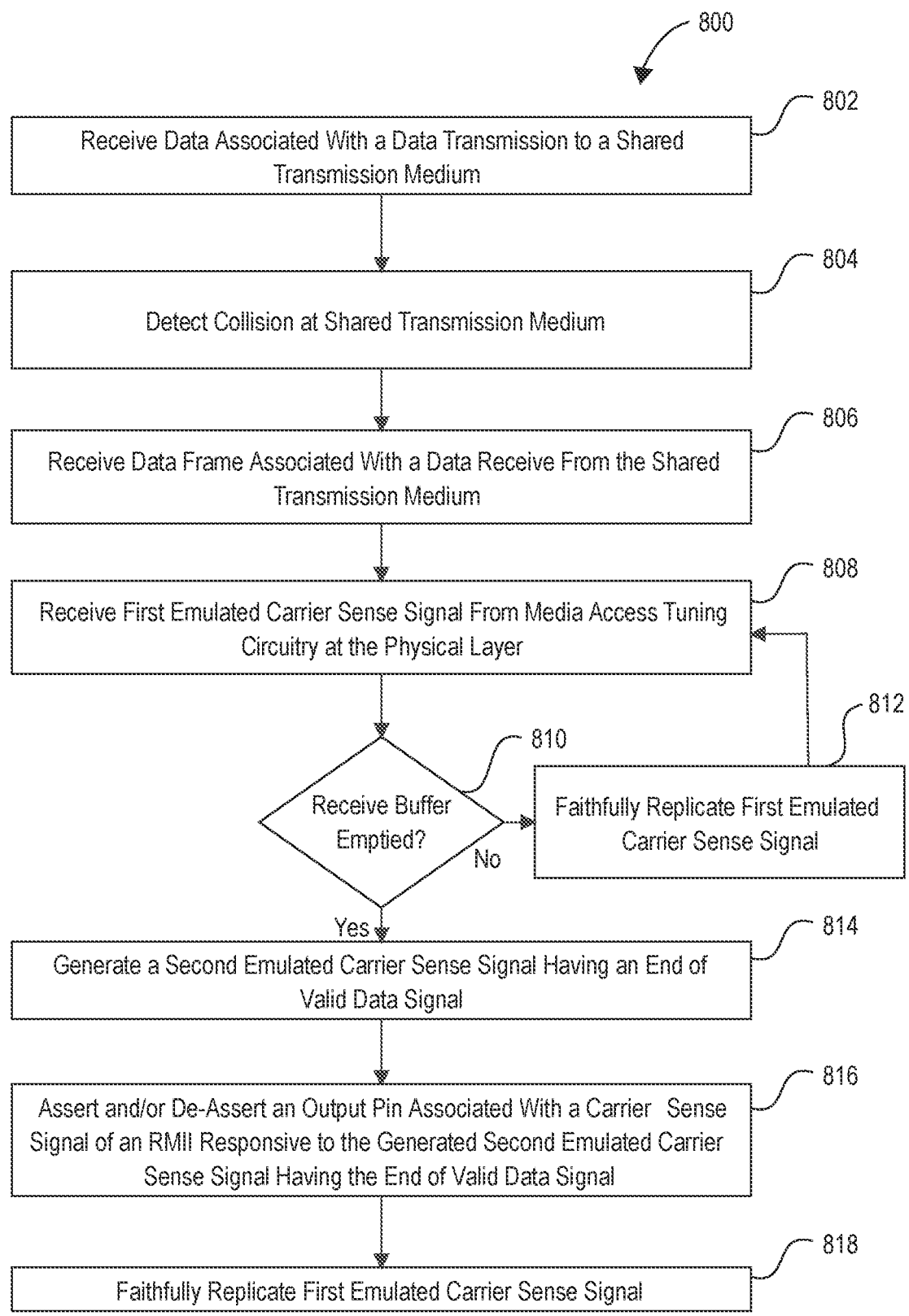
FIG. 8 is a flow chart of a process for managing carrier sense signaling at a receiving physical layer device/system after a collision on a shared transmission medium, in accordance with one or more embodiments of the disclosure.

FIG. 8 shows a process 800 for managing carrier sense signaling at a receiving physical layer device/system, such as physical layer system 500, without limitation, after a collision on a shared transmission medium, in accordance with one or more disclosed embodiments. In operation 802, physical layer system 500 receives data associated with a data transmission (e.g., receives transmit frames) to shared transmission medium 534. In operation 804, a collision is detected at shared transmission medium 534. Physical layer system 500, and media access tuning circuitry 516 more specifically, may detect the collision, as a non-limiting example in response to transmit enable 524 being asserted (e.g., by a MAC device) and carrier sense signal 518 is generated (indicating a presence of a carrier on shared transmission medium 534). Notably, a CSMA link layer device (not shown) coupled to physical layer system 500 may implement aspects of its collision detection protocol (e.g., transmits a short jam sequence of frames and backing off for a random period of time).

In operation 806, physical layer system 500 receives data frames associated with a data reception (i.e., receives "receive frames") from shared transmission medium 534. By way of non-limiting example, receive frames of the data reception of operation 806 may be associated with the collision detected in operation 804. For example, receive frames of the data reception may be from a physical layer device/system that owns a current transmit opportunity, or may simply correspond to a carrier detected that gave rise to detecting a collision.

While not shown in FIG. 8, first emulation circuitry 528 of media access tuning circuitry 516 generates first emulated carrier sense signal 520 responsive to collision handling logic and carrier sense signal 518. In contemplated operations, depending on its collision handling logic, first emulation circuitry 528 may faithfully replicate carrier sense signal 518 or generate a first emulated carrier sense signal 520 that is different than carrier sense signal 518.

In operation 808, interface circuitry 508 receives first emulated carrier sense signal 520 from media access tuning circuitry 516. In operation 810, interface circuitry 508 determines if receive buffer 510 is empty. Notably, in this example, if receive buffer 510 is empty, then that would be a condition that triggers interface circuitry 508 to modify first emulated carrier sense signal 520 in order to enable correct signaling at RMI interface 506. If receive buffer 510 is not empty (i.e., still storing receive frames), then in operation 812, second emulated carrier sense signal 522 generated by interface circuitry 508 is a faithful replication of first emulated carrier sense signal 520, and process 800 loops back to operation 808. If receive buffer 510 is empty, (e.g., no more frames remain in receive buffer 510), then in operation 814, interface circuitry 508 generates second emulated carrier sense signal 522 such that it is a modified emulated carrier sense signal. In one embodiment, the second emulated carrier sense signal 522 generated by interface circuitry 508 includes a gap that is an end of data signal indicating an end of the data reception.

In operation 816, an output signal is asserted and/or de-asserted responsive to the generated second emulated carrier sense signal. In one embodiment, the asserted and/or de-asserted signal appears on an output pin associated with carrier and data 514 to generate a CRS_DV signal that includes a gap 214 of FIG. 2.

In operation 818, after the generation of the gap of operation 814, interface circuitry 508 generates second emulated carrier sense signal 522 such that it is a faithful replication of first emulated carrier sense signal 520, in other words, interface circuitry 508 generates a faithful replication of an emulated carrier sense signal generated by media access tuning circuitry 516 as second emulated carrier sense signal 522.

Figure 9:
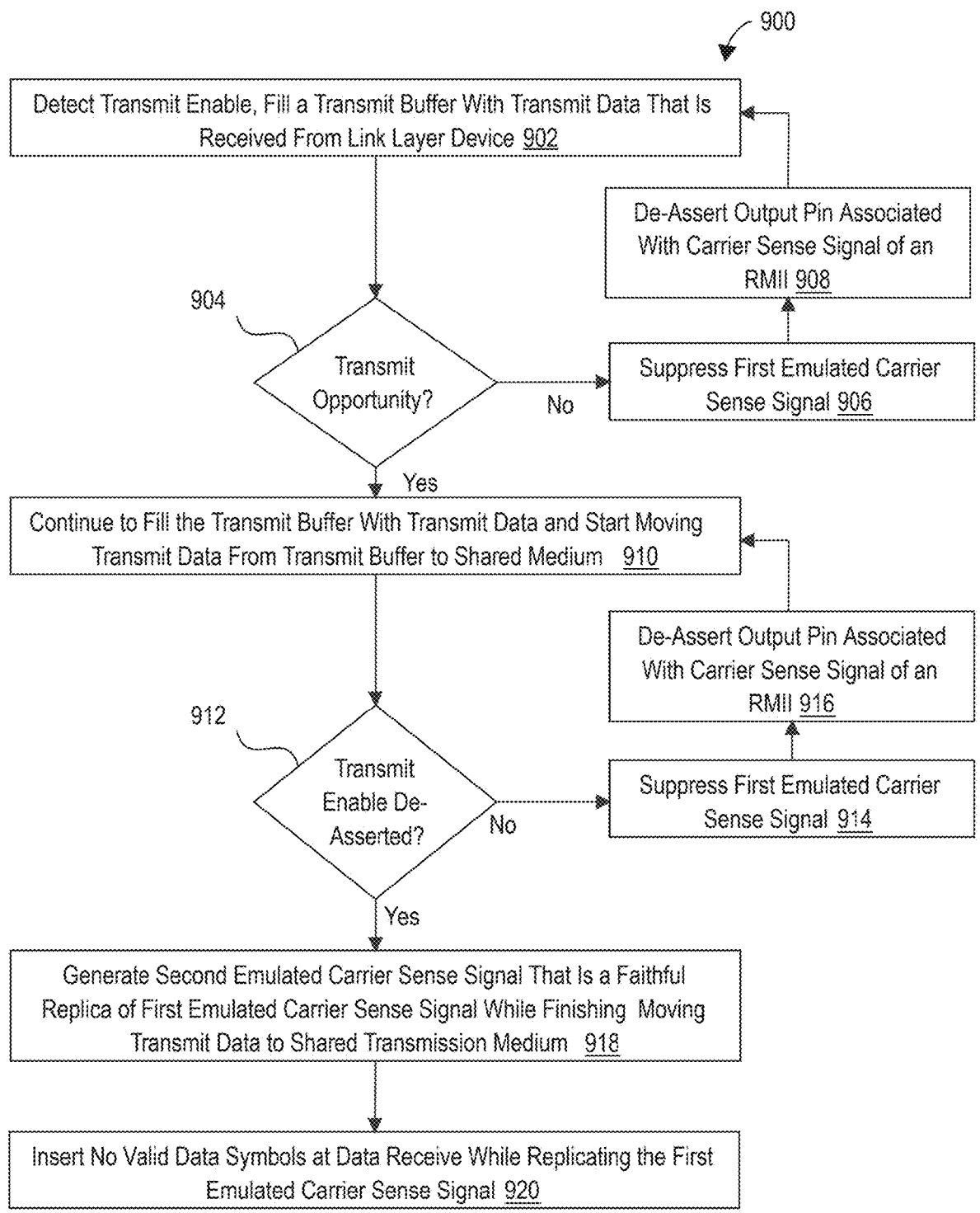
FIG. 9 is a flow chart of a process for managing carrier sense signals at a transmitting PHY, in accordance with one or more embodiments of the disclosure.

FIG. 9 shows a process 900 for managing carrier sense signaling at a transmitting PHY, in accordance with one or more disclosed embodiments. In operation 902, physical layer system 500 detects transmit enable 524 is asserted and begins to store transmit data at transmit buffer 512.

In operation 904, interface circuitry 508 determines whether a transmit opportunity has started. If a transmit opportunity has not started, then in operation 906, interface circuitry 508 suppresses first emulated carrier sense signal 520 generated by media access tuning circuitry 516. In operation 908, a carrier sense signal of an RMII is de-asserted in response to the suppressed first emulated carrier sense signal 520 of operation 906.

After detecting a transmit opportunity has started, in operation 910, interface circuitry 508 continues to fill transmit buffer 512 with second transmit data and starts moving first transmit data from transmit buffer 512 to shared transmission medium 534.

In operation 912, interface circuitry 508 determines whether transmit enable 524 has been de-asserted, based on which interface circuitry 508 infers that the link layer device—i.e., the connected MAC layer—is done sending transmit data. If the transmit enable 524 has not been de-asserted, then in operation 914, interface circuitry 508 suppresses the first emulated carrier sense signal 520 received from media access tuning circuitry 516. In operation 916, the carrier sense signal of the RMII is de-asserted in response to the suppressed first emulated carrier sense signal 520 of operation 914.

If the transmit enable 524 is de-asserted, then in operation 918, interface circuitry 508 generates second emulated carrier sense signal 522 that is a faithful replica of first emulated carrier sense signal 520 while physical layer system 500 finishes moving transmit data from transmit buffer 512 to shared transmission medium 534.

In operation 920, interface circuitry 508 inserts no data valid symbols at receive data 532 at least while faithfully replicating first emulated carrier sense signal 520—that is, while asserting second emulated carrier sense signal 522.

While not shown in FIG. 9, the carrier sense signal of the RMII may be asserted and/or de-asserted in response to the generated second emulated carrier sense signal of operation 918.

Figure 10:
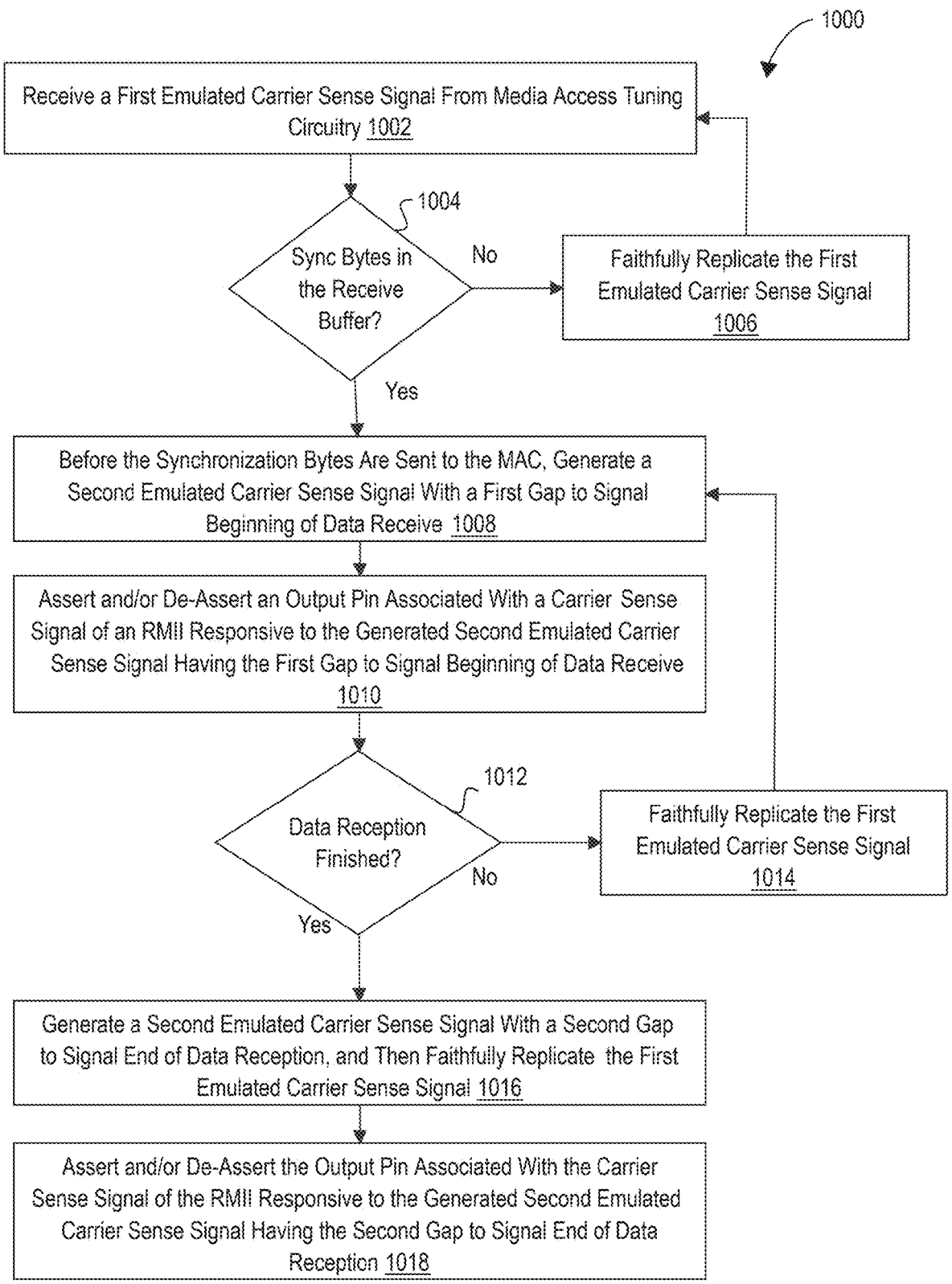
FIG. 10 is a flow chart of a process for managing carrier sense signals at a receiving PHY that is time aware or shaping traffic, in accordance with one or more embodiments of the disclosure.

FIG. 10 shows a process 1000 for managing carrier sense signaling at a receiving PHY configured to force time aware deferral and/or traffic shaping, in accordance with one or more disclosed embodiments. In operation 1002, interface circuitry 508 receives first emulated carrier sense signal 520 from media access tuning circuitry 516, which is asserted because media access tuning circuitry 516 is receiving while waiting for the next transmit opportunity. In operation 1004, interface circuitry 508 checks if there are any synchronization bytes in the receive buffer 510. As a non-limiting example, synchronization bytes may be a preamble of an Ethernet frame. If there are no synchronization bytes, then in operation 1006, interface circuitry 508 faithfully replicates first emulated carrier sense signal 520 received from media access tuning circuitry 516 as second emulated carrier sense signal 522, and process 1000 loops back to operation 1002.

If there are synchronization bytes in the receive buffer then, in operation 1008, before the synchronization bytes are sent to a MAC, interface circuitry 508 generates second emulated carrier sense signal 522 with a first gap that indicates a data reception is about to start. The first gap 432 is shown in the process 400 of FIG. 4, with respect to times 430 and 434.

In operation 1010, an output carrier sense signal of RMI interface 506 (e.g., carrier and data 514) is asserted and/or de-asserted in response to the generated second emulated carrier sense signal having the first gap to signal the beginning of the data reception. In one embodiment, asserted and/or de-asserted carrier and data 514 generate a CRS_DV signal that includes a gap 444 of FIG. 4.

In operation 1012, interface circuitry 508 determines if the data reception is finished. If the data reception is not finished, then in operation 1014, interface circuitry 508 faithfully replicates first emulated carrier sense signal 520 generated by media access tuning circuitry 516 as second emulated carrier sense signal 522, while physical layer system 500 transfers receive frames from the receive buffer to the MAC. If the data reception is finished, then in operation 1016, interface circuitry 508 generates a second emulated carrier sense signal with a gap to indicate the end of the data reception. The second gap 444 is shown in the process 400 of FIG. 4 with respect to times 436 and 438.

In operation 1018, the output carrier sense signal of RMI interface 506 (e.g., output by carrier and data 514) is asserted and/or de-asserted in response to the generated second emulated carrier sense signal having the first gap to signal the end of the data reception. In one embodiment, carrier and data 514 generates a CRS_DV signal that includes a gap 440 of FIG. 4.

In connection with certain embodiments, PHY devices and systems such as PHY device 104, PHY device 108, and physical layer system 500, may be shown or described as having interface circuitry that includes an RMI interface. One of ordinary skill in the art will appreciate that disclosed embodiments are equally applicable to arrangements where a PHY device implements a media independent interface (MII) and is coupled to an RMI interface implemented in a separate chip between a PHY device and a MAC device. By way of non-limiting example, RMI interface 506 of FIG. 5 may be implemented in a same chip package as interface circuitry 508 or in a different chip package.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

Additional non-limiting embodiments of the disclosure include:

Embodiment 1: a method, the method comprising: sensing, at a physical layer device, a carrier of a shared transmission medium; and asserting or de-asserting an output signal associated with a carrier sense signal of a reduced media independent interface (RMII) of the physical layer device responsive to the sensed carrier.

Embodiment 2: the method according to Embodiment 1, wherein the asserting or de-asserting the output signal associated with the carrier sense signal of the RMII comprises: asserting the output signal for at least a portion of a period of time that the sensed carrier is idle.

Embodiment 3: the method according to any of Embodiments 1 and 2, wherein the asserting or de-asserting the output signal associated with the carrier sense signal of the RMII comprises: de-asserting the output signal for at least a portion of a period of time that the sensed carrier is active.

Embodiment 4: the method according to any of Embodiments 1 through 3, further comprising: receiving a first emulated carrier sense signal generated by a media access tuning circuitry; generating a second emulated carrier sense signal responsive to detecting that the first emulated carrier sense signal would cause incorrect signaling at the reduced media independent interface (RMII); and providing the second emulated carrier sense signal to the RMII.

Embodiment 5: the method according to any of Embodiments 1 through 4, wherein the generating the second emulated carrier sense signal responsive to the detecting that the first emulated carrier sense signal would cause incorrect signaling at the RMII comprises: detecting an end of a data reception following a collision at the shared transmission medium; and generating the second emulated carrier sense signal by modifying the first emulated carrier sense signal generated by the media access tuning circuitry to include an end of data reception signal responsive to the detecting the end of the data reception.

Embodiment 6: the method according to any of Embodiments 1 through 5, further comprising: replicating the first emulated carrier sense signal generated by the media access tuning circuitry during the data reception; and replicating the first emulated carrier sense signal generated by the media access tuning circuitry after providing the second emulated carrier sense signal to the RMII.

Embodiment 7: the method according to any of Embodiments 1 through 6, wherein the generating the second emulated carrier sense signal responsive to the detecting that the first emulated carrier sense signal would cause incorrect signaling at the RMII comprises: suppressing assertion of the first emulated carrier sense signal while waiting for a link layer device to finish providing transmit data.

Embodiment 8: the method according to any of Embodiments 1 through 7, wherein the suppressing assertion of the first emulated carrier sense signal while waiting for the link layer device to finish providing transmit data comprises: detecting a start of a data transmission by the link layer device; and suppressing assertion of the first emulated carrier sense signal while a transmit buffer is being filled with first transmit data that is received from the link layer device.

Embodiment 9: the method according to any of Embodiments 1 through 8, wherein the suppressing assertion of the first emulated carrier sense signal while waiting for the link layer device to finish providing transmit data further comprises: suppressing assertion of the first emulated carrier sense signal while the transmit buffer is being filled with second transmit data that is received from the link layer device and the first transmit data is being moved from the transmit buffer to the shared transmission medium.

Embodiment 10: the method according to any of Embodiments 1 through 9, wherein suppressing assertion of the first emulated carrier sense signal while waiting for the link layer device to finish providing transmit data further comprises: filling a receive buffer with symbols indicative of no valid data present; replicating the first emulated carrier sense signal generated by the media access tuning circuitry while the second transmit data is being moved from the transmit buffer to the shared transmission medium.

Embodiment 11: the method according to any of Embodiments 1 through 10, wherein the generating the second emulated carrier sense signal responsive to detecting that the first emulated carrier sense signal would cause incorrect signaling at the RMII comprises: detecting synchronization bytes at a receive buffer of the media access tuning circuitry; and generating the second emulated carrier sense signal by modifying the first emulated carrier sense signal generated by the media access tuning circuitry to include a start of a data reception signal responsive to the detecting the synchronization bytes at the receive buffer of the media access tuning circuitry.

Embodiment 12: the method according to any of Embodiments 1 through 11, further comprising: replicating the first emulated carrier sense signal generated by the media access tuning circuitry until the detecting the synchronization bytes at the receive buffer of the media access tuning circuitry.

Embodiment 13: the method according to any of Embodiments 1 through 12, further comprising: providing the second emulated carrier sense signal to the RMII before the synchronization bytes are provided to a link layer device.

Embodiment 14: the method according to any of Embodiments 1 through 13, further comprising: providing the second emulated carrier sense signal to the RMII after all receive buffer bytes are provided to the link layer device.

Embodiment 15: the method according to any of Embodiments 1 through 14, further comprising: replicating the first emulated carrier sense signal generated by the media access tuning circuitry after providing the second emulated carrier sense signal to the RMII.

Embodiment 16: the method according to any of Embodiments 1 through 15, wherein the generating the second emulated carrier sense signal comprises modifying the first emulated carrier sense signal to include a gap.

Embodiment 17: the method according to any of Embodiments 1 through 16, wherein generating the second emulated carrier sense signal comprises adapting a portion of the first emulated carrier sense signal to have a detectable shape.

Embodiment 18: a physical layer (PHY) device, comprising: a transmission circuitry configured to send and receive data to and from a shared transmission medium; sensing circuitry configured to sense a carrier of the shared transmission medium; and one or more input/output (I/O) pins, wherein an output pin of the one or more I/O pins is associated with an output signal for a carrier sense signal of a reduced media independent interface (RMII).

Embodiment 19: the device according to Embodiment 18, wherein the output signal is assertable for at least a portion of a period of time that a sensed carrier is idle.

Embodiment 20: the device according to any of Embodiments 18 and 19, wherein the output signal is de-assertable for at least a portion of a period of time that a sensed carrier is active.

Embodiment 21: the device according to any of Embodiments 18 through 20, further comprising: a media access tuning circuitry configured to generate a first emulated carrier sense signal; and an interface circuitry configured to: receive the first emulated carrier sense signal generated by the media access tuning circuitry; generate a second emulated carrier sense signal responsive to detecting that the first emulated carrier sense signal would cause incorrect signaling at the RMII; and provide the second emulated carrier sense signal to the RMII.

Embodiment 22: the device according to any of Embodiments 18 through 21, wherein the interface circuitry is configured to generate the second emulated carrier sense signal responsive to the detecting that the first emulated carrier sense signal would cause incorrect signaling at the RMII by: detecting an end of a data reception following a collision at the shared transmission medium; and generating the second emulated carrier sense signal by modifying the first emulated carrier sense signal generated by the media access tuning circuitry to include an end of data reception signal responsive to the detecting the end of the data reception.

Embodiment 23: the device according to any of Embodiments 18 through 22, wherein the interface circuitry is configured to: replicate the first emulated carrier sense signal generated by during the data reception; and replicate the first emulated carrier sense signal generated by the media access tuning circuitry after providing the second emulated carrier sense signal to the RMII.

Embodiment 24: the device according to any of Embodiments 18 through 23, wherein the interface circuitry is configured to generate the second emulated carrier sense signal responsive to the detecting that the first emulated carrier sense signal would cause incorrect signaling at the RMII by: suppressing the first emulated carrier sense signal while waiting for a link layer device to finish providing transmit data.

Embodiment 25: the device according to any of Embodiments 18 through 24, wherein the interface circuitry is configured to suppress the first emulated carrier sense signal while waiting for the link layer device to finish providing transmit data by: detecting a start of a data transmission by the link layer device; suppressing the first emulated carrier sense signal while first transmit data is being received from the link layer device and a transmit buffer is being filled with the first transmit data.

Embodiment 26: the device according to any of Embodiments 18 through 25, wherein the interface circuitry is further configured to suppress the first emulated carrier sense signal while waiting for the link layer device to finish providing transmit data by: suppressing the first emulated carrier sense signal while second transmit data is being received from the link layer device and the transmit buffer is being filled with the second transmit data.

Embodiment 27: the device according to any of Embodiments 18 through 26, wherein the interface circuitry is configured to: fill a receive buffer with symbols indicative of no valid data present while transmission circuitry moves the second transmit data from the transmit buffer to the shared transmission medium; and replicate the first emulated carrier sense signal generated by the media access tuning circuitry while the transmission circuitry moves the second transmit data from the transmit buffer to the shared transmission medium.

Embodiment 28: the device according to any of Embodiments 18 through 27, wherein the interface circuitry is configured to generate the second emulated carrier sense signal responsive to the detecting that the first emulated carrier sense signal would cause incorrect signaling at the RMII by: detecting synchronization bytes at a receive buffer of the media access tuning circuitry; and generating the second emulated carrier sense signal by modifying the first emulated carrier sense signal generated by the media access tuning circuitry to include a start of a data reception signal responsive to the detecting the synchronization bytes at the receive buffer of the media access tuning circuitry.

Embodiment 29: the device according to any of Embodiments 18 through 28, wherein the interface circuitry is configured to provide the second emulated carrier sense signal to the RMII before the synchronization bytes are provided to a link layer device.

Embodiment 30: the device according to any of Embodiments 18 through 29, wherein the interface circuitry is configured to: replicate the first emulated carrier sense signal generated by the media access tuning circuitry until the detecting the synchronization bytes at the receive buffer of the media access tuning circuitry.

Embodiment 31: the device according to any of Embodiments 18 through 30, wherein the interface circuitry is configured to provide the second emulated carrier sense signal to the RMII after all the data from the receive buffer is transferred to the link layer device.

Embodiment 32: the device according to any of Embodiments 18 through 31, wherein the interface circuitry is configured to: replicate the first emulated carrier sense signal generated by the media access tuning circuitry after providing the second emulated carrier sense signal to the RMII.

Embodiment 33: the device according to any of Embodiments 18 through 32, wherein the interface circuitry is configured to generate the second emulated carrier sense signal by modifying the first emulated carrier sense signal to include a gap.

Embodiment 34: the device according to any of Embodiments 18 through 33, wherein the interface circuitry is configured to generate the second emulated carrier sense signal by modifying the first emulated carrier sense signal to include a pulse.

Embodiment 35: the device according to any of Embodiments 18 through 34, wherein the interface circuitry is configured to generate the second emulated carrier sense signal by adapting a portion of the first emulated carrier sense signal to have a detectable shape.

What is claimed is:

1. An apparatus, comprising:
   a reconciliation sublayer of a physical layer;
   a reduced media independent interface (RMII) of the physical layer; and
   a logic circuit to:
      receive a changed carrier sense signal provided by the reconciliation sublayer;
      generate a further changed carrier sense signal at least partially responsive to a prediction that the changed carrier sense signal would cause unintended signaling at the RMII; and
      provide the further changed carrier sense signal to the RMII.

2. The apparatus of claim 1, wherein the logic circuit to:
   generate the further changed carrier sense signal to indicate an end of data reception to a CSMA/CD MAC after detection of collision during a transmit opportunity of another physical layer.

3. The apparatus of claim 1, wherein the reconciliation sublayer of the physical layer is a physical layer collision avoidance (PLCA) reconciliation sublayer.

4. An apparatus, comprising:
   a reconciliation sublayer of a physical layer;
   a reduced media independent interface (RMII) of the physical layer; and
   a logic circuit to:
      receive a changed carrier sense signal provided by the reconciliation sublayer;
      generate a further changed carrier sense signal at least partially responsive to a prediction that the changed carrier sense signal would cause unintended signaling at the RMII; and
      provide the further changed carrier sense signal to the RMII,
   wherein the logic circuit to:
      upon a start of data transmission by a CSMA/CD MAC prior to a next transmit opportunity of the physical layer, generate the further changed carrier sense signal to indicate no active carrier at a shared transmission medium to the CSMA/CD MAC until an end of data transmission by the CSMA/CD MAC; and
      upon the end of data transmission, generate the further changed carrier sense signal as a replica of the changed carrier sense signal at least until an end of the next transmit opportunity of the physical layer.

5. An apparatus, comprising:
   a reconciliation sublayer of a physical layer;
   a reduced media independent interface (RMII) of the physical layer; and
   a logic circuit to:
      receive a changed carrier sense signal provided by the reconciliation sublayer;
      generate a further changed carrier sense signal at least partially responsive to a prediction that the changed carrier sense signal would cause unintended signaling at the RMII; and
      provide the further changed carrier sense signal to the RMII,
   wherein the logic circuit to:
      generate signaling to keep a CSMA/CD MAC in deferral state;
      upon a start of transmit window of another physical layer, generate signaling to cause the CSMA/CD MAC to change from deferral state to data reception state; and
      upon an end of transmit window of another physical layer, generate signaling to cause the CSMA/CD MAC to change from data reception state to deferral state.

6. A method, comprising:
   receiving a changed carrier sense signal from a reconciliation sublayer of a physical layer;
   generating a further changed carrier sense signal at least partially responsive to a prediction that the changed carrier sense signal would cause unintended signaling at a reduced media independent interface (RMII); and
   providing the further changed carrier sense signal to the RMII.

7. The method of claim 6, comprising:
   generating the further changed carrier sense signal indicating an end of data reception to a CSMA/CD MAC after detecting collision during a transmit opportunity of another physical layer.

8. The method of claim 6, wherein the reconciliation sublayer of the physical layer is a physical layer collision avoidance (PLCA) reconciliation sublayer.

9. A method, comprising:
   receiving a changed carrier sense signal from a reconciliation sublayer of a physical layer;
   generating a further changed carrier sense signal at least partially responsive to a prediction that the changed carrier sense signal would cause unintended signaling at a reduced media independent interface (RMII),
   wherein upon a start of data transmission by a CSMA/CD MAC prior to a next transmit opportunity of the physical layer, generating the further changed carrier sense signal indicating no active carrier at a shared transmission medium to the CSMA/CD MAC until an end of data transmission,
   wherein upon the end of data transmission, generating the further changed carrier sense signal as a replica of the changed carrier sense signal at least until an end of the next transmit opportunity of the physical layer, and
   providing the further changed carrier sense signal to the RMII.

10. A method, comprising:
    receiving a changed carrier sense signal from a reconciliation sublayer of a physical layer, the changed carrier sense signal at least partially based on:
    signaling generated to keep a CSMA/CD MAC in deferral state;
    upon a start of transmit window of another physical layer, signaling generated to cause the CSMA/CD MAC to change from deferral state to data reception state; or
    upon an end of transmit window of another physical layer, signaling generated to cause the CSMA/CD MAC to change from data reception state to deferral state;

generating a further changed carrier sense signal at least partially responsive to a prediction that the changed carrier sense signal would cause unintended signaling at a reduced media independent interface (RMII); and providing the further changed carrier sense signal to the RMII.

\* \* \* \* \*

UNITED STATES PATENT AND TRADEMARK OFFICE
CERTIFICATE OF CORRECTION

| | | |
|---|---|---|
| PATENT NO. | : 12,256,443 B2 | Page 1 of 1 |
| APPLICATION NO. | : 18/054100 | |
| DATED | : March 18, 2025 | |
| INVENTOR(S) | : Dixon Chen et al. | |

It is certified that error appears in the above-identified patent and that said Letters Patent is hereby corrected as shown below:

In the Specification

Column 11, Line 23, change "de-asserts CRSDV 408." to --de-asserts CRS_DV 408.--

Signed and Sealed this
Twenty-fourth Day of June, 2025

Coke Morgan Stewart
*Acting Director of the United States Patent and Trademark Office*